United States Patent
Katayama et al.

(10) Patent No.: US 10,817,103 B2
(45) Date of Patent: Oct. 27, 2020

(54) STRUCTURE TO AVOID GAPS BETWEEN SWITCHES/TOUCH PANEL AND CASE OF A TOUCH PANEL DEVICE

(71) Applicant: FUJITSU COMPONENT LIMITED, Tokyo (JP)

(72) Inventors: Masahiko Katayama, Tokyo (JP); Yutaka Ueno, Tokyo (JP); Katsuhiko Tanaka, Tokyo (JP); Satoshi Sakurai, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 253 days.

(21) Appl. No.: 15/269,213

(22) Filed: Sep. 19, 2016

(65) Prior Publication Data

US 2017/0205935 A1 Jul. 20, 2017

(30) Foreign Application Priority Data

Jan. 15, 2016 (JP) .................. 2016-006623

(51) Int. Cl.
*G06F 3/041* (2006.01)
*G06F 3/045* (2006.01)
*G02F 1/1333* (2006.01)

(52) U.S. Cl.
CPC ........ *G06F 3/0416* (2013.01); *G02F 1/13338* (2013.01); *G06F 3/045* (2013.01);
(Continued)

(58) Field of Classification Search
CPC ...... G06F 3/0416; G06F 3/045; G06F 3/0412; G06F 2203/04103; G06F 2203/0411; G06F 2203/04111; H01H 13/00; G02F 1/13338
See application file for complete search history.

(56) References Cited

U.S. PATENT DOCUMENTS 5,152,392 A * 10/1992 Iwasa .................. H01H 13/705
                                                        200/329
5,518,078 A * 5/1996 Tsujioka ................. G06F 3/045
                                                      178/18.05
(Continued)

FOREIGN PATENT DOCUMENTS

JP          4-15813          1/1992
JP          04015813 A * 1/1992
(Continued)

OTHER PUBLICATIONS

Office Action for Taiwanese Patent Application No. 105134151, dated Jun. 7, 2017.

(Continued)

*Primary Examiner* — Temesghen Ghebretinsae
*Assistant Examiner* — Ivelisse Martinez Quiles
(74) *Attorney, Agent, or Firm* — Staas & Halsey LLP

(57) ABSTRACT

A touch panel device including: a first substrate having a first surface and a second surface arranged on an opposite side of the first surface; a second substrate having a third surface facing the first surface of the first substrate via a space; a first transparent conductive film formed on the first surface; a second transparent conductive film formed on the third surface; an adhesive layer formed between the first transparent conductive film and the second transparent conductive film; and a decorative film that is fixed on the second surface, and includes a switch unit that projects in a direction from second substrate toward the first substrate.

7 Claims, 25 Drawing Sheets

(52) U.S. Cl.
CPC .. *G06F 3/0412* (2013.01); *G06F 2203/04103* (2013.01); *G06F 2203/04111* (2013.01)

(56) References Cited

U.S. PATENT DOCUMENTS

| | | | | |
|---|---|---|---|---|
| 2004/0026222 | A1* | 2/2004 | Adachi | H01H 13/702 200/512 |
| 2009/0135161 | A1* | 5/2009 | Endo | G06F 1/1626 345/174 |
| 2010/0225606 | A1 | 9/2010 | Sasaki et al. | |
| 2011/0115738 | A1* | 5/2011 | Suzuki | G01L 1/205 345/173 |
| 2013/0050095 | A1* | 2/2013 | Nakajima | G06F 3/0202 345/168 |
| 2014/0145978 | A1* | 5/2014 | Hsu | G06F 3/0416 345/173 |
| 2014/0293164 | A1* | 10/2014 | Kim | G06F 3/0412 349/12 |
| 2015/0261297 | A1* | 9/2015 | Quek | G06F 3/0416 345/174 |

FOREIGN PATENT DOCUMENTS

| | | |
|---|---|---|
| JP | 8-16302 | 1/1996 |
| JP | 08016302 A * | 1/1996 |
| JP | 2004-039266 | 2/2004 |
| JP | 2007-324097 | 12/2007 |
| JP | 2009-43056 | 2/2009 |
| JP | 2009-129370 | 6/2009 |
| JP | 2011-59267 | 3/2011 |
| JP | 2014-77821 | 5/2014 |
| JP | 2015-68909 | 4/2015 |
| TW | 201042526 A1 | 12/2010 |
| TW | I412968 B | 10/2013 |
| WO | WO 2016/002675 A1 | 1/2016 |

OTHER PUBLICATIONS

Espacenet Bibliographic Data/Abstract for Taiwanese Pub. No. 201042526, Published Dec. 1, 2010.
Espacenet Bibliographic Data/Abstract for Taiwanese Pub. No. I412968, Published Oct. 21, 2013.
J-Plat Pat Abstract of Publication No. 2004-039266, published Feb. 5, 2004.
J-Plat Pat Abstract of Publication No. 2007-324097, published Dec. 13, 2007.
Japanese Platform for Patent Information, Publication No. 2014-77821, published May 1, 2014.
Japanese Platform for Patent Information, Publication No. 2015-68909, published Apr. 13, 2015.
Espacenet English abstract for International Publication No. WO 2016/002675 A1, published Jan. 7, 2016.
Japanese Office Action dated Jul. 2, 2019 in corresponding Japanese Patent Application No. 2016-006623.

* cited by examiner

FIG. 5A
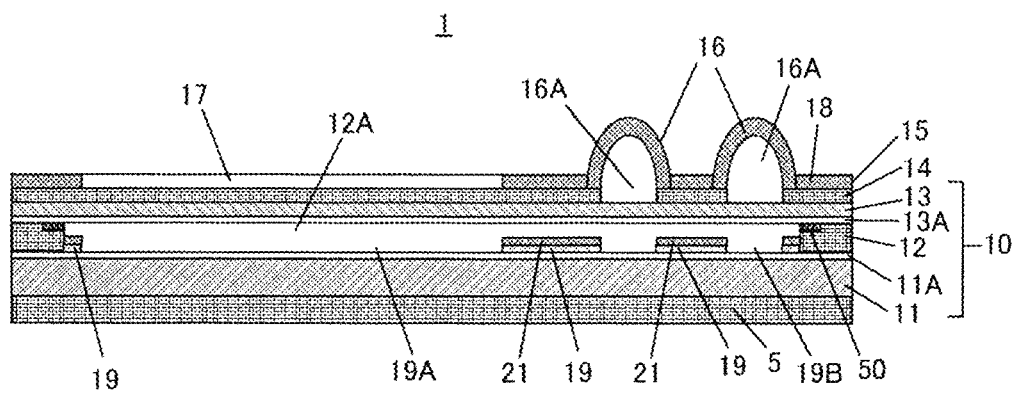
FIG. 5B
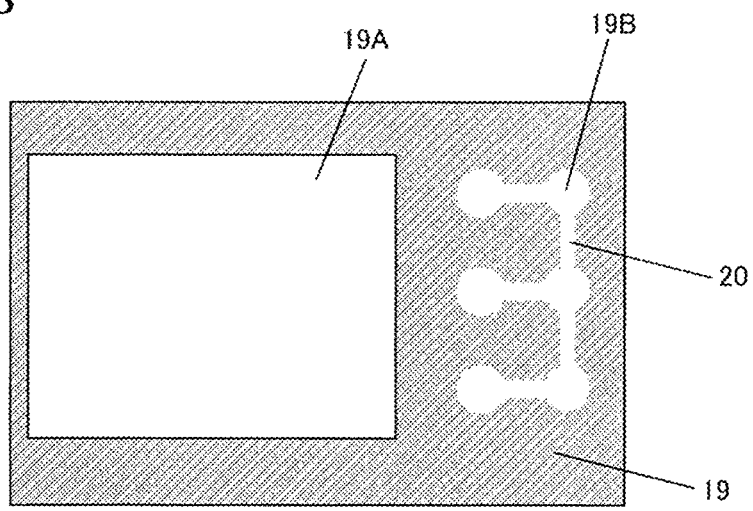
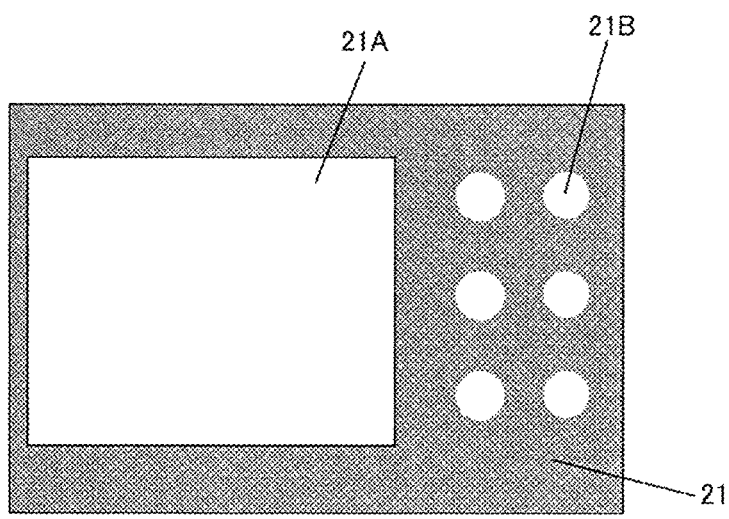

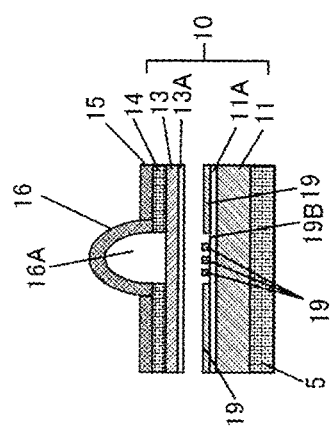
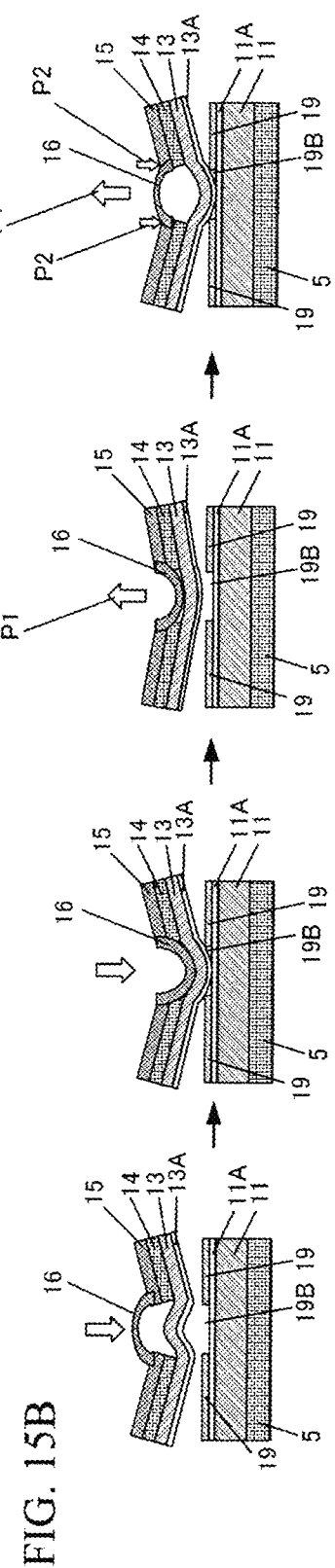
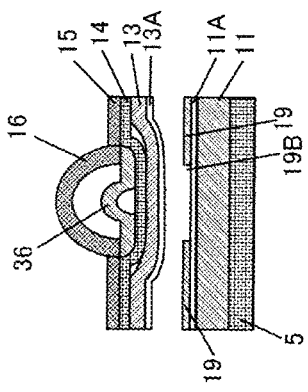

FIG. 23A
FIG. 23B
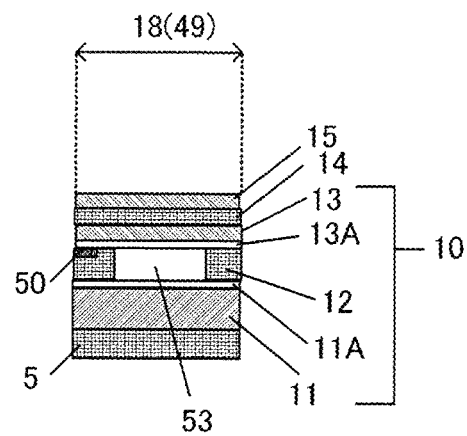
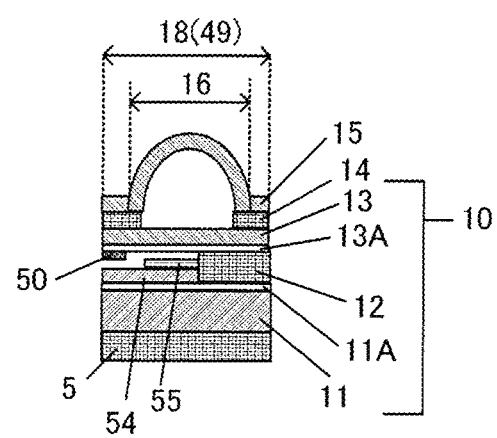
FIG. 23C
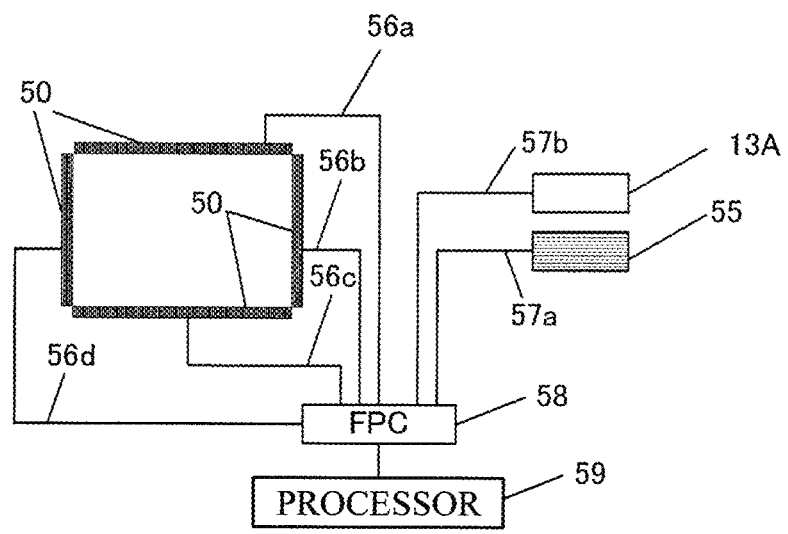
FIG. 23D
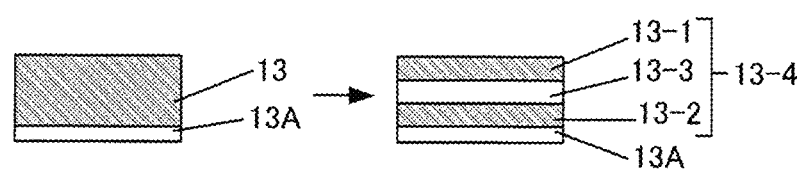

STRUCTURE TO AVOID GAPS BETWEEN SWITCHES/TOUCH PANEL AND CASE OF A TOUCH PANEL DEVICE

CROSS-REFERENCE TO RELATED APPLICATION

This application is based upon and claims the benefit of priority of the prior Japanese Patent Application No. 2016-006623 filed on Jan. 15, 2016, the entire contents of which are incorporated herein by reference.

FIELD

A certain aspect of the embodiments is related to a touch panel device.

BACKGROUND

Conventionally, there has been known a touch panel device in which a decorative layer is formed on a non-operation domain receiving no touch input (Japanese Laid-open Patent Publication Nos. 2015-68909 and 2014-77821).

FIG. 1A is a plain view of a conventional touch panel device. FIG. 1B is a cross-section diagram taken along line A-A in FIG. 1A. When a resistive film type touch panel is installed as an operation panel of a copy device, for example, a first opening is formed in a substantially center of a resin case, and the resistive film type touch panel is implemented under the first opening, as illustrated in FIGS. 1A and 1B. Then, mechanical switches are disposed around the resistive film type touch panel, and second openings for depressing the mechanical switches are formed on the resin case.

SUMMARY

According to an aspect of the present invention, there is provided a touch panel device including: a first substrate having a first surface and a second surface arranged on an opposite side of the first surface; a second substrate having a third surface facing the first surface of the first substrate via a space; a first transparent conductive film formed on the first surface; a second transparent conductive film formed on the third surface; an adhesive layer formed between the first transparent conductive film and the second transparent conductive film; and a decorative film that is fixed on the second surface, and includes a switch unit that projects in a direction from second substrate toward the first substrate.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a cross-section diagram of a second variation of the touch panel device 1;

FIG. 5B is a top view of the first variation of the photoresist 19 and an UV curing resin 21 printed on the photoresist 19;

FIG. 15A is an enlarged cross-section diagram of the switch unit 16 when the touch panel device 1 includes dot-like photoresists 19;

FIG. 15B is a diagram illustrating state transition of the switch unit 16 when the touch panel device 1 includes no dot-like photoresists 19;

FIG. 15C is a diagram illustrating a reference example of the switch unit 16 when the touch panel device 1 includes no dot-like photoresists 19;

FIG. 23A is a diagram illustrating a third variation of the non-operation domain 18;

FIG. 23B is a diagram illustrating a fourth variation of the non-operation domain 18;

FIG. 23C is a diagram illustrating wiring structure of the touch panel device 1;

FIG. 23D is a diagram illustrating a variation of a film 13;

DESCRIPTION OF EMBODIMENTS

Figure 1A:
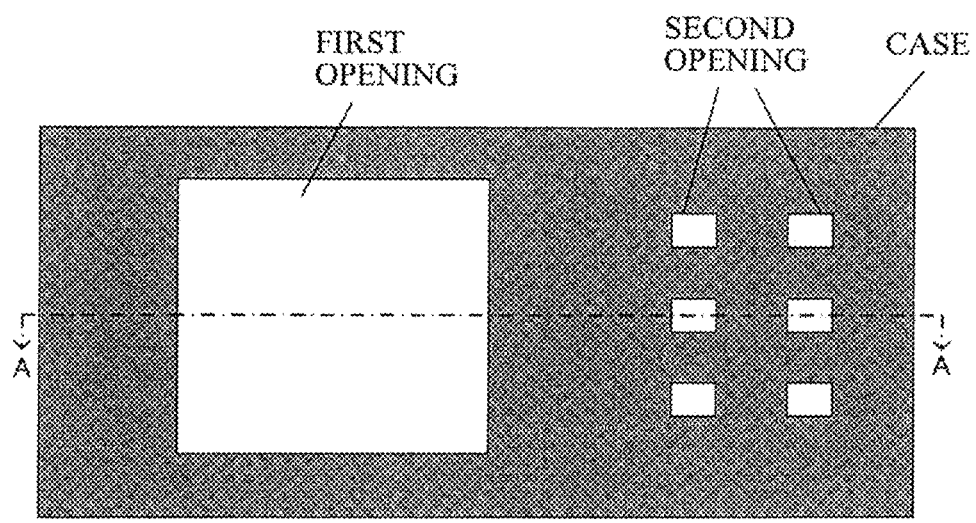
FIG. 1A is a plain view of a conventional touch panel device.
Figure 1B:
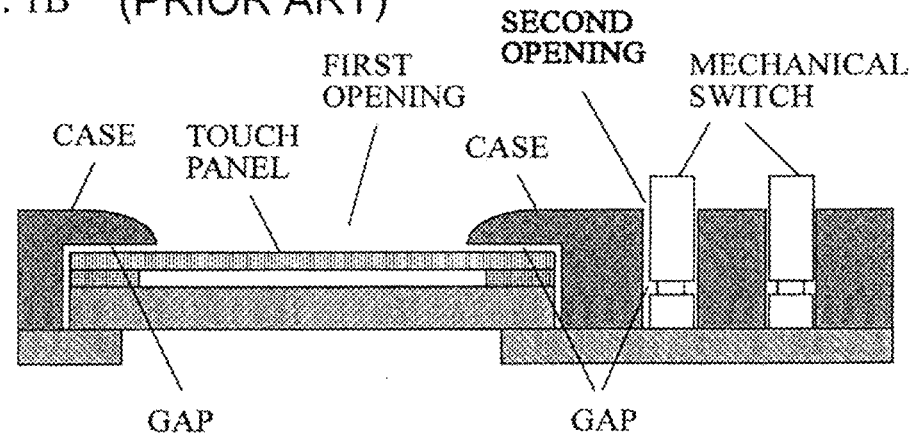
FIG. 1B is a cross-section diagram taken along line A-A in FIG. 1A.

In the touch panel device of FIGS. 1A and 1B, gaps exist between the touch panel and the case and between the mechanical switches and the case, and hence an erroneous input and a malfunction by the intrusion of foreign matters may occur in the touch panel device, and the touch panel device has a weak waterproofness.

A description will now be given of embodiments of the present invention with reference to the drawings.

Figure 2A:
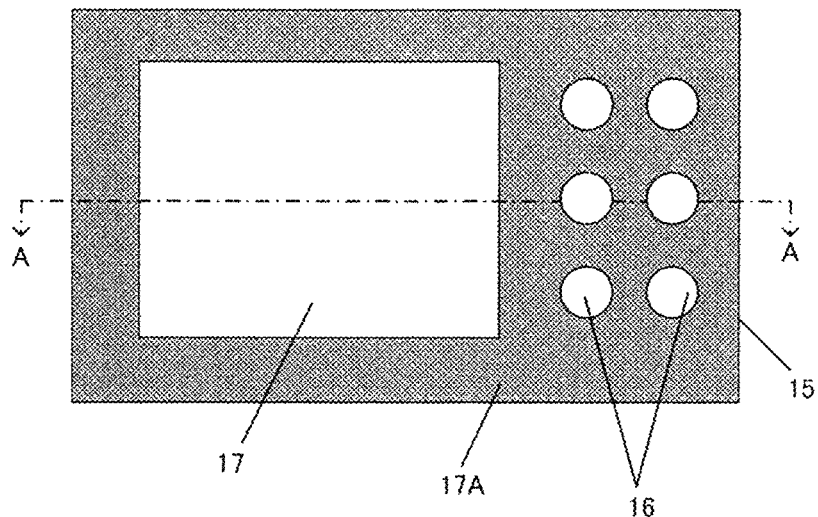
FIG. 2A is a top view of a touch panel device 1 according to the present embodiment.
Figure 2B:
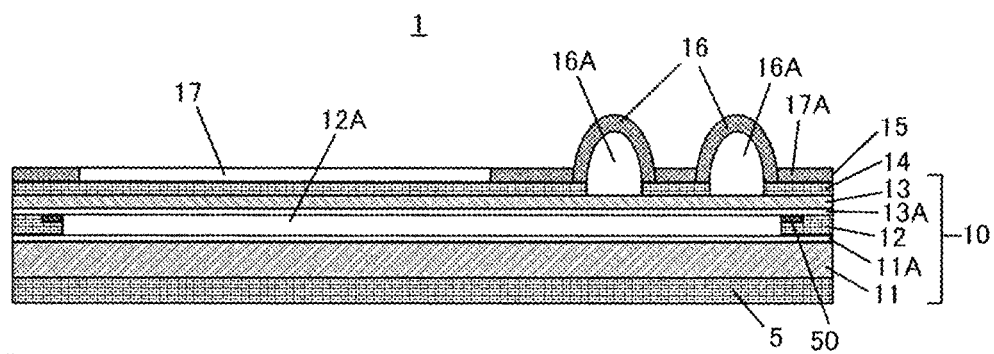
FIG. 2B is a cross-section diagram taken along line A-A in FIG. 2A.
Figure 2C:
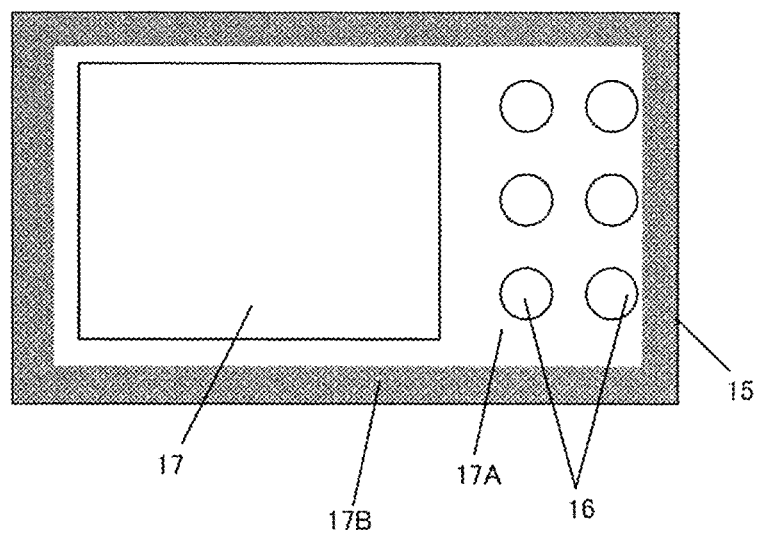
FIG. 2C is a diagram illustrating a variation of a decorative film 15.

FIG. 2A is a top view of a touch panel device 1 according to the present embodiment. FIG. 2B is a cross-section diagram taken along line A-A in FIG. 2A. FIG. 2C is a diagram illustrating a variation of a decorative film 15.

In the present embodiment, the touch panel device 1 includes a transparent touch panel 10, a transparent adhesive layer 14 and the decorative film 15, as illustrated in FIG. 2B. For example, a display (LCD) 5 is attached under the touch panel 10. The adhesive layer 14 bonds a film 13 to the decorative film 15, and is a double-stick tape or an optical paste, for example.

The touch panel 10 is a resistive film type touch panel. The touch panel 10 includes: a glass substrate 11 which is an example of a lower substrate (a second substrate); a transparent conductive film 11A which is an example of a second transparent conductive film; an adhesive layer 12; the film 13 which is an example of an upper substrate (a first substrate); a transparent conductive film 13A which is an example of a first transparent conductive film; and electrodes 50. The glass substrate 11 and the film 13 are transparent. An air gap 12A is formed between the glass substrate 11 and the film 13. The adhesive layer 12 bonds the film 13 to the glass substrate 11, and is a double-stick tape, for example. The film 13 is composed of a PET (polyethylene terephthalate) film, for example. The conductive film 11A is formed on an upper surface of the glass substrate 11. The conductive film 13A is formed on a lower surface of the film 13. The conductive films 11A and 13A are ITO (Indium Tin Oxide), for example. The conductive films 11A and 13A contact each other, so that touch input is carried out.

An upper surface of the touch panel 10 is covered by the decorative film 15 illustrated in FIG. 2A. The decorative film 15 includes: the projection-shaped switch units 16 that project from the film 13 toward a side opposite to a side where the glass substrate 11 is provided; an operation domain 17 opposite to a domain of the touch panel 10 receiving the touch input; and a decorative domain 17A, as illustrated in FIG. 2B. The switch units 16, the operation domain 17 and the decorative domain 17A are integrally formed with each other. Embossing is used as a formation method of the switch units 16.

The operation domain 17 is transparent. Each of the switch units 16 is formed on the film 13 via a space 16A. The adhesive layer 14 is not provided under each switch unit 16. The switch unit 16 may be transparent or chromatic. For example, the decorative domain 17A is black for hiding wirings. Therefore, an operator cannot see the display 5 arranged under the decorative domain 17A, but can see, via the touch panel 10 and the operation domain 17, an image displayed on the display 5 arranged under the operation domain 17. Moreover, when the switch unit 16 is transparent, the operator can see an image, such as an icon of the button, displayed on the display 5. The operation domain 17 serves as a display domain that displays an image displayed on the display 5. The operation domain 17 may be a through hole. The electrodes 50 detect the depression of the switch unit 16, the touch input of the operation domain 17, and coordinates of the touch input.

In the touch panel device 1 of FIG. 2B, the switch units 16 corresponding to the mechanical switches of FIG. 1B are formed integrally with the decorative film 15. No gap occurs between the touch panel and the case, and between the mechanical switches and the case. Moreover, since all the surface of the touch panel 10 is covered by the decorative film 15, the touch panel device 1 can prevent the occurrence of a malfunction and an erroneous input by the intrusion of foreign matters, and have excellent waterproofness. Since the decorative film 15 is flat except for the switch units 16, the design of the touch panel device 1 can be also improved. In addition, since the embossing is performed on the decorative film 15 and the embossing is not performed on the film 13, a crack can be prevented from occurring due to the embossing of the film 13 and the conductive film 13A.

As illustrated in FIG. 2C, a part of the decorative domain 17A other than an outer peripheral domain 17B for hiding wirings, not shown, may be transparent in addition to the operation domain 17 and the switch units 16. The operator can see, via the transparent touch panel 10, the image displayed on the display 5 arranged under the part of the decorative domain 17A other than the peripheral domain 17B. In this case, the adhesive layer 14 also can be transparent.

Moreover, all the surface of the decorative domain 17A may be transparent. In this case, all the surface of the decorative film 15 is transparent, and therefore a black image for hiding the wirings is displayed on a display domain of the display 5 corresponding to a domain on which the wirings are arranged.

Figure 3A:
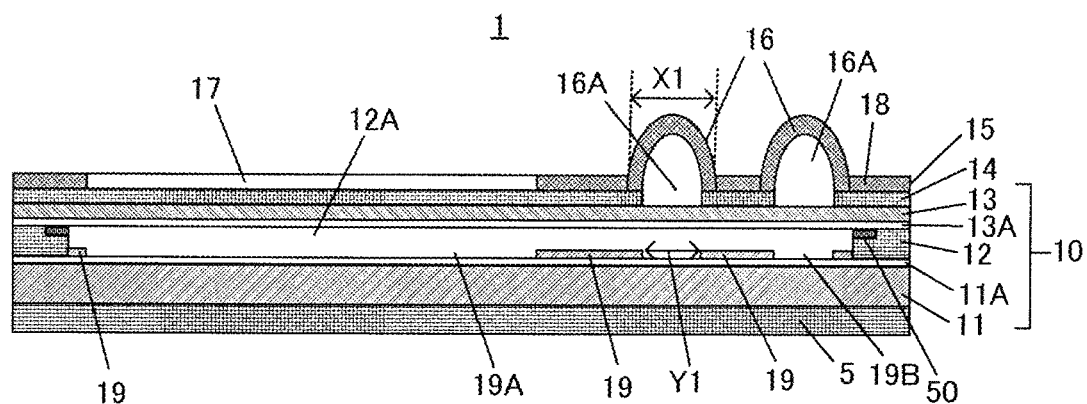
FIG. 3A is a cross-section diagram of a first variation of the touch panel device 1.
Figure 3B:
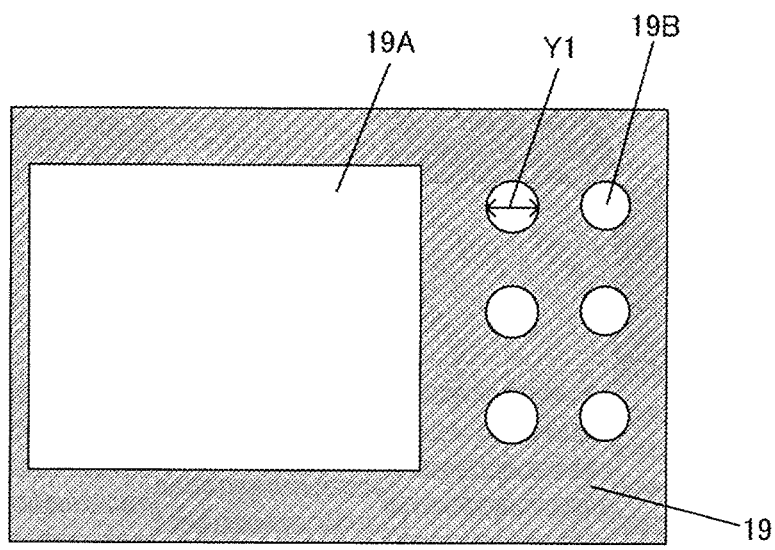
FIG. 3B is a top view of a photoresist 19.

FIG. 3A is a cross-section diagram of a first variation of the touch panel device 1. FIG. 3B is a top view of a photoresist.

In the touch panel device 1 of FIG. 2A, the resistive film type touch panel 10 is arranged even under the decorative domain 17A, and therefore there may be the erroneous input by the depression of the decorative domain 17A. For this reason, an insulating photoresist 19 is formed on a part of the conductive film 11A opposite to the decorative domain 17A (i.e., a domain other than the switch units 16 and the operation domain 17), as illustrated in FIG. 3A. The photoresist 19 serves as a first insulating layer. The photoresist 19 covers the part of the conductive film 11A opposite to the decorative domain 17A, so that the erroneous input by the depression of the decorative domain 17A can be avoided. As a result, the decorative domain 17A of FIG. 3A serves as a non-operation domain 18 that does not receive the touch input. Other components of the touch panel device 1 are the same as the corresponding components of FIG. 2B.

The photoresist 19 includes a hole 19A formed at a position opposite to the operation domain 17, and holes 19B formed at positions opposite to the switch units 16, as illustrated in FIG. 3B. The shape of each hole 19B is a circle, but may be an N-sided polygon (N is an integer of 3 or more).

A diameter Y1 of the hole 19B formed at the position opposite to the switch unit 16 is smaller than a diameter X1 of the switch unit 16. Preferably, the diameter Y1 is smaller than the diameter X1 by 1 mm or more. This is because when the diameter Y1 is larger than the diameter X1, the conductive film 11A contacts the conductive film 13A before the switch unit 16 is pushed down and completely dented, and hence the erroneous input of the switch unit 16 may occur.

Figure 4A:
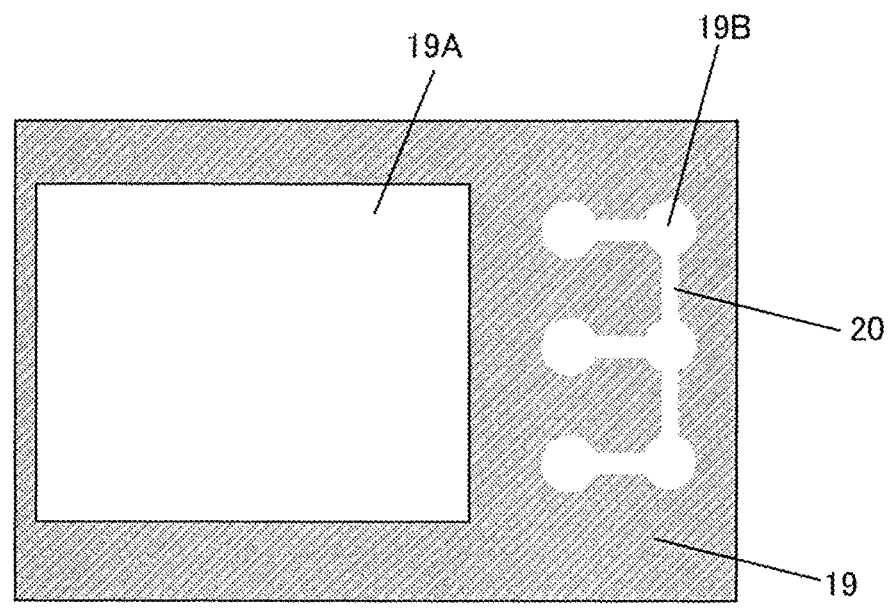
FIG. 4A is a top view of a first variation of the photoresist 19.
Figure 4B:
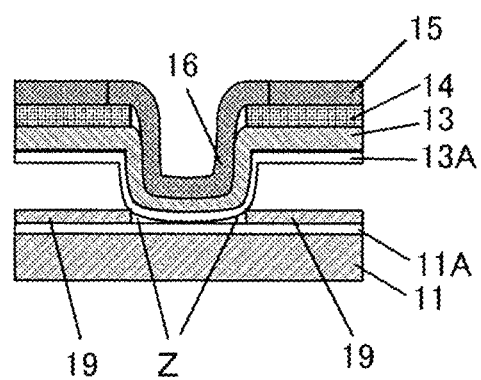
FIG. 4B is an enlarged cross-section diagram of peripheral structure of a switch unit 16 when the switch unit 16 is depressed.

FIG. 4A is a top view of a first variation of the photoresist 19. FIG. 4B is an enlarged cross-section diagram of peripheral structure of the switch unit 16 when the switch unit 16 is depressed. As illustrated in FIG. 4A, the photoresist 19 includes a ventilation passage 2Q which enables an air to flow in and out and connects the holes 19B to each other, in addition to the hole 19A and the holes 19B.

In the photoresist 19 of FIG. 3B, each hole 19B is formed in an independent circle. Therefore, when the switch unit 16 is depressed, a portion Z surrounded in the conductive films 11A and 13A and the photoresist 19 becomes a vacuum, and hence the film 13 and the conductive film 13A may be hard to come back to original positions, as illustrated in FIG. 4B. For this reason, the ventilation passage 20 enabling the air to flow to/from the respective holes 19B is formed on the photoresist 19 as illustrated in FIG. 4A, which makes it easy to return the film 13 and the conductive film 13A to the original positions.

FIG. 5A is a cross-section diagram of a second variation of the touch panel device 1. FIG. 5B is a top view of the first variation of the photoresist 19 and an UV (Ultraviolet) curing resin 21 printed on the photoresist 19.

In the touch panel device 1 of FIG. 5A, an insulating UV curing resin 21 is formed on the photoresist 19 by screen printing. The UV curing resin 21 serves as a second insulating layer. As illustrated in FIG. 5B, an opening 21A is formed at a position of the UV curing resin 21 opposite to the operation domain 17 and the hole 19A, and openings 21B are formed at positions of the UV curing resin 21 opposite to the switch units 16 and the holes 19B. The UV curing resin 21 is also provided on the ventilation passage 20. Due to the insulating UV curing resin 21 arranged on the ventilation passage 20, the erroneous input by the depression of the ventilation passage 20 can be prevented. Since the insulating UV curing resin 21 is formed on the photoresist 19, an insulation performance between the conductive films 11A and 13A can be kept even when there is a pinhole in the photoresist 19. The shape of each opening 21B is a circle, but may be an N-sided polygon (N is an integer of 3 or more).

Figure 6A:
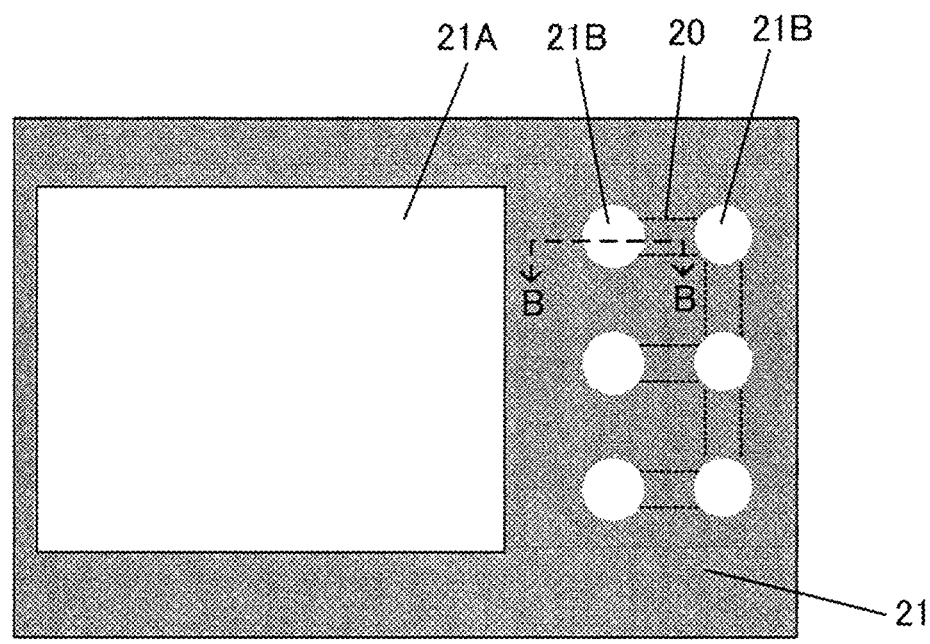
FIG. 6A is a top view of the UV curing resin 21 when the UV curing resin 21 is formed on the photoresist 19.
Figure 6B:
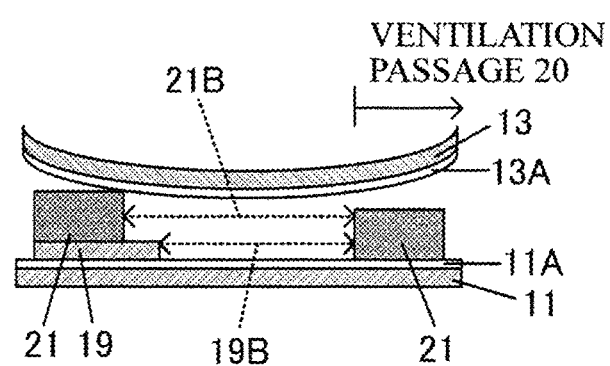
FIG. 6B is a cross-section diagram taken along line B-B in FIG. 6A.

FIG. 6A is a top view of the UV curing resin 21 when the UV curing resin 21 is formed on the photoresist 19. FIG. 6B is a cross-section diagram taken along line B-B in FIG. 6A.

The diameter of each opening 21B of the UV curing resin 21 is larger than that of each hole 19B of the photoresist 19, as illustrated in FIG. 6B. Preferably, the diameter of each opening 21B is larger than that of each hole 19B by 0.5 mm or more.

The photoresist 19 and the UV curing resin 21 are arranged on a domain between the opening 21A and the openings 21B. On the other hand, only the UV curing resin 21 is arranged on a domain on the ventilation passage 20, but the photoresist 19 is not arranged thereon. For this reason, the position of the UV curing resin 21 in the domain on the ventilation passage 20 is lower than that of the UV curing resin 21 on the domain between the opening 21A and the openings 21B by the thickness of the photoresist 19. In the domain on the ventilation passage 20, a space between the conductive film 13A and the UV curing resin 21 serves as the ventilation passage 20, so that the air can flow in and out via the ventilation passage 20 even when the switch unit 16 is depressed.

Figure 7A:
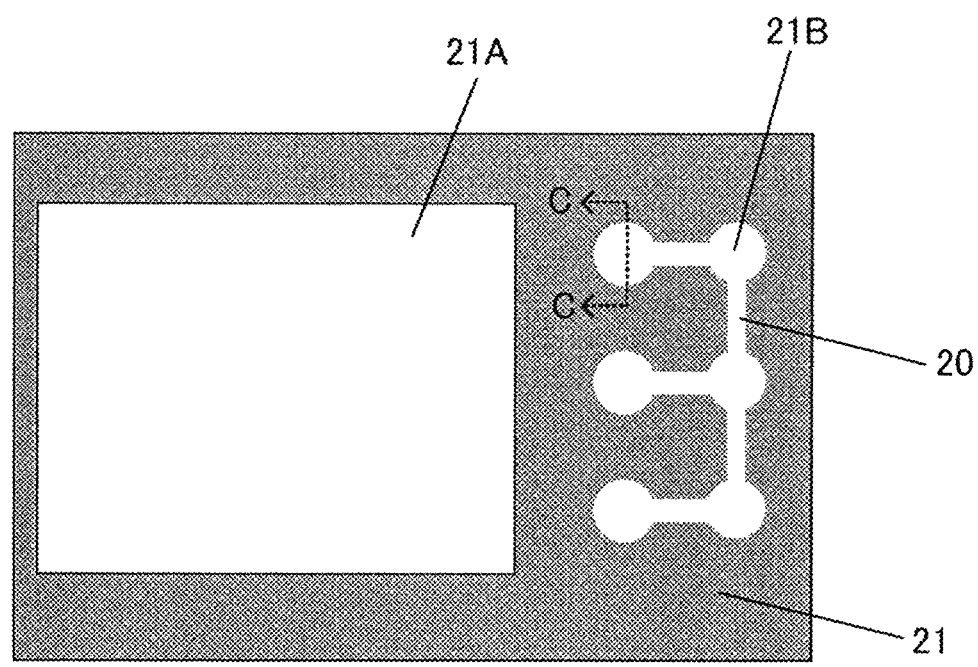
FIG. 7A is a top view of a variation of the UV curing resin 21 when the UV curing resin 21 is formed on the photoresist 19.
Figure 7B:
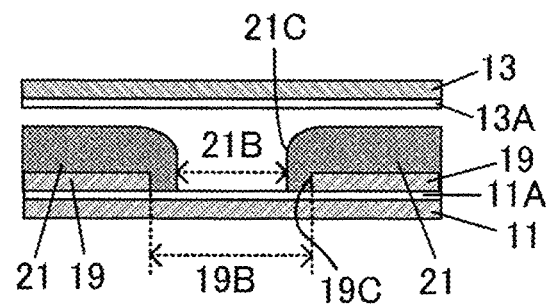
FIG. 7B is a cross-section diagram taken along line C-C in FIG. 7A.

FIG. 7A is a top view of a variation of the UV curing resin 21 when the UV curing resin 21 is formed on the photoresist 19. FIG. 7B is a cross-section diagram taken along line C-C in FIG. 7A.

As illustrated in FIG. 7A, the UV curing resin 21 also may include the ventilation passage 20 which enables the air to flow in and out and connects the openings 21B to each other. In this case, the photoresist 19 and the UV curing resin 21 are not formed on the ventilation passage 20.

As illustrated in FIG. 7B, the diameter of each opening 21B of the UV curing resin 21 may be smaller than that of each hole 19B of the photoresist 19. Edge portions 21C of the UV curing resin 21 formed by screen-printing are rounded in comparison with edge portions 19C of the photoresist 19 formed by photolithography. Even when the switch unit 16 is depressed, the conductive film 13A does not touch the edge portions 19C of the photoresist 19 due to this roundness, which can reduce a damage against the conductive film 13A of the film 13 and reduce the occurrence of a crack of the conductive film 13A.

Figure 8:
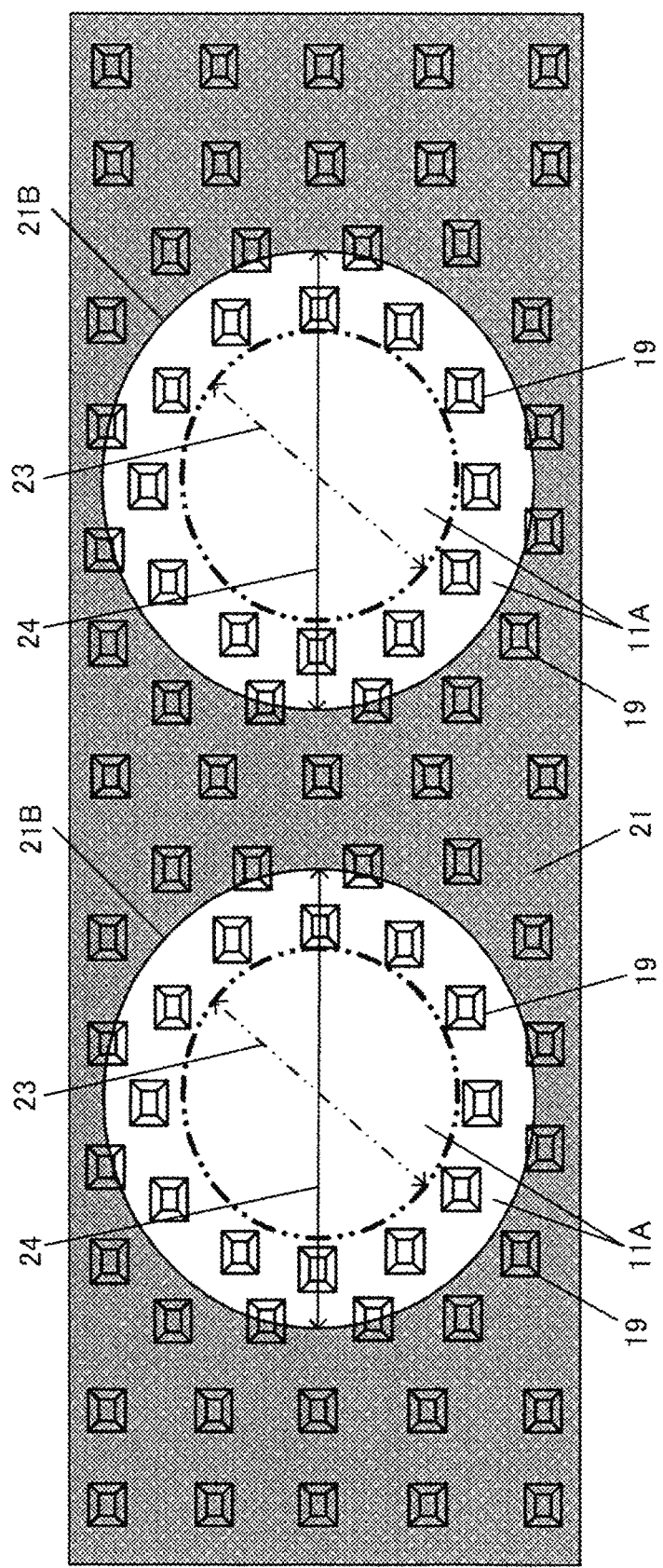
FIG. 8 is a top view of a conductive film 11A, the photoresist 19 and the UV curing resin 21 located under the switch units 16.

FIG. 8 is a top view of the conductive film 11A, the photoresist 19 and the UV curing resin 21 located under the switch units 16.

In FIG. 8, dot-like photoresists 19 are formed on the conductive film 11A. By the photoresists 19 circularly arranged inside the opening 21B, a space for opening is formed. A diameter 24 of the opening 21B of the UV curing resin 21 is larger than a diameter 23 of an opening formed with the photoresists 19 arranged inside the opening 21B. The UV curing resin 21 is formed on the photoresists 19 arranged outside the opening 21B. In the example of FIG. 8, the photoresists 19 are thickly arranged on a portion where the conductive film 11A is exposed via the opening 21B.

The dot-like photoresists 19 are formed on the portion where the conductive film 11A is exposed, as illustrated in FIG. 8, so that an air hole is formed between the conductive film 11A and the UV curing resin 21. Therefore, the film 13 and the conductive film 13A easily return to the original positions, as with a case where the ventilation passage 20 is formed.

Even when a crack occurs in the conductive film 13A due to the edges of the photoresists 19, the conductive film 13A and the photoresists 19 do not contact each other at positions where no photoresists 19 exist, and hence the damage of the conductive film 13A by the edges of the photoresist 19 is reduced. Accordingly, the film 13 and the conductive film 13A can be prevented from completely exfoliating at a portion just below the switch unit 16 except for a crack occurrence portion, a current can flow in the conductive film 13A just below the switch unit 16, and hence the dot-like photoresists 19 do not affect on-and-off detection of the switch unit 16.

A distance between the centers of the dot-like photoresists 19 adjacent to each other around the opening 21B is equal to or less than 0.275 μm, and a single photoresist 19 is 0.05 mm square. Since the distance between the centers of the photoresists 19 adjacent to each other is equal to or less than 0.275 μm, the conductive film 11A is prevented from contacting the conductive film 13A before the switch unit 16 is depressed and dented. That is, the occurrence of the erroneous input of the switch unit 16 can be prevented.

Figure 9:
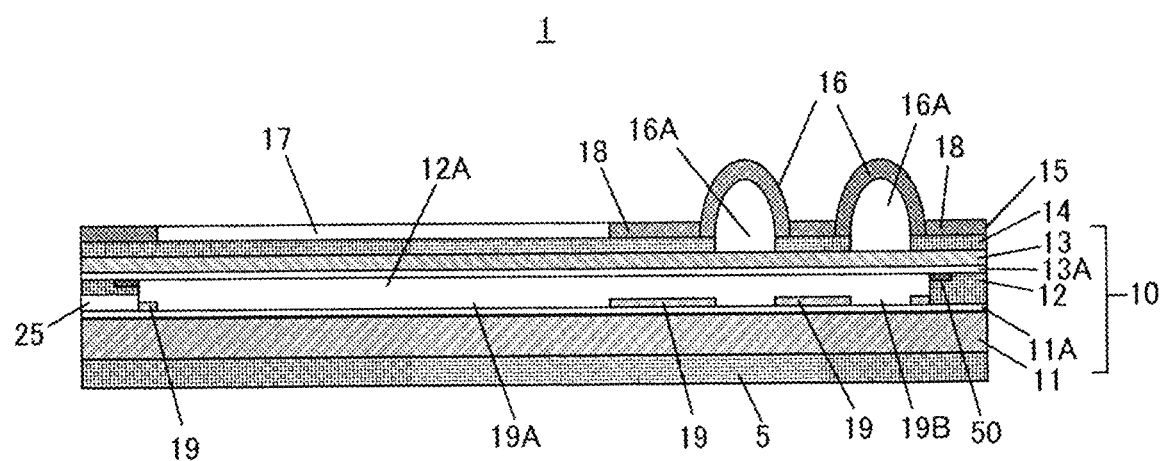
FIG. 9 is a cross-section diagram of a third variation of the touch panel device 1.

FIG. 9 is a cross-section diagram of a third variation of the touch panel device 1. An air passage 25 connecting the hole 19A to the outside is formed on the adhesive layer 12, as illustrated in FIG. 9. Other elements of FIG. 9 are the same as corresponding elements of FIG. 3A. Air in the touch panel 10 can be discharged from the air passage 25 to the outside of the touch panel 10. This makes it possible to suppress distortion of the film 13 by the temperature and the humidity and to make the film 13 flat.

Figure 10A:
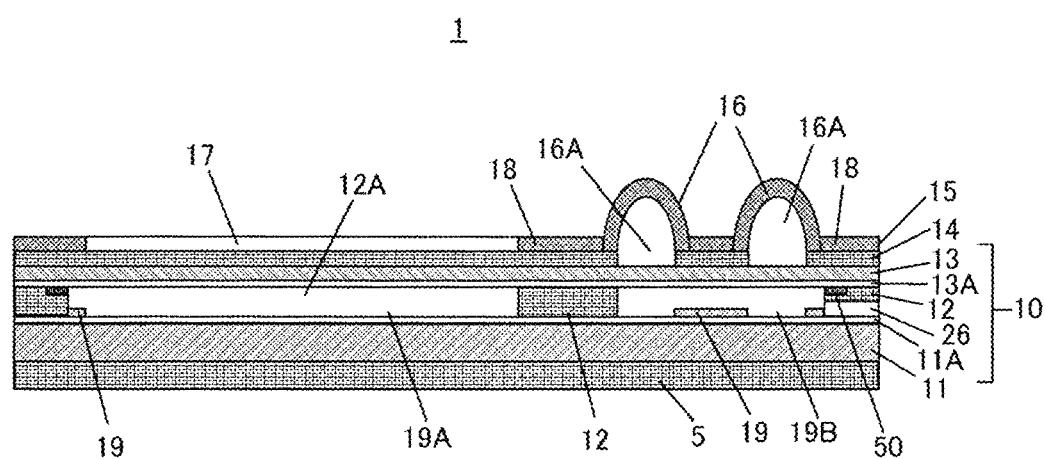
FIG. 10A is a cross-section diagram of a fourth variation of the touch panel device 1.
Figure 10B:
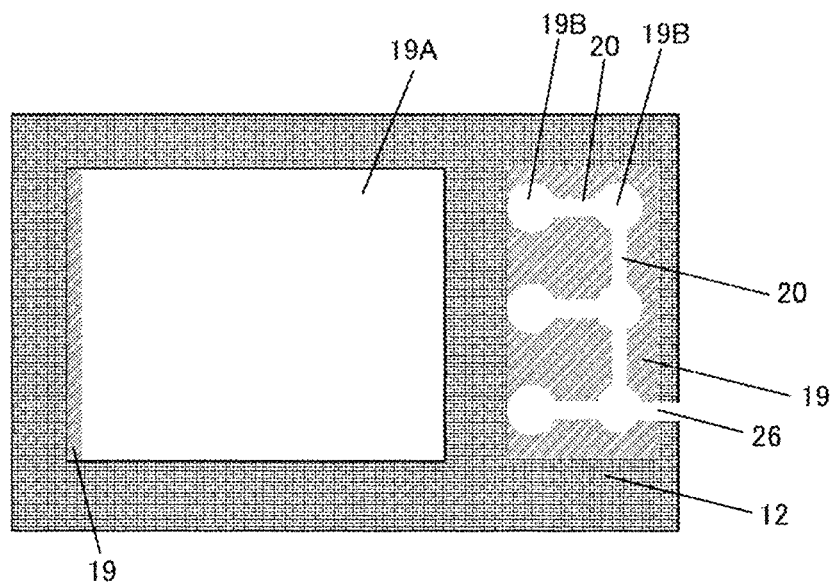
FIG. 10B is a top view of an adhesive layer 12 and the photoresist 19.

FIG. 10A is a cross-section diagram of a fourth variation of the touch panel device 1. FIG. 10B is a top view of the adhesive layer 12 and the photoresist 19. An air passage 26 connecting the hole 19B to the outside is formed on the adhesive layer 12, as illustrated in FIGS. 10A and 10B. The adhesive layer 12 is also formed between the hole 19A and the hole 19B, and the air gap 12A under the operation domain 17 is sealed by the adhesive layer 12. When the film 13 sinks low, an interference fringe may occur in the image displayed on the display device. However, since the air gap 12A under the operation domain 17 is sealed, can support the film 13 and prevent the appearance of the interference fringe. Since the hole 19B under the switch unit 16 is connected to the outside, the distortion of a domain of the film 13 where the switch unit 16 is formed can be prevented.

Figure 11A:
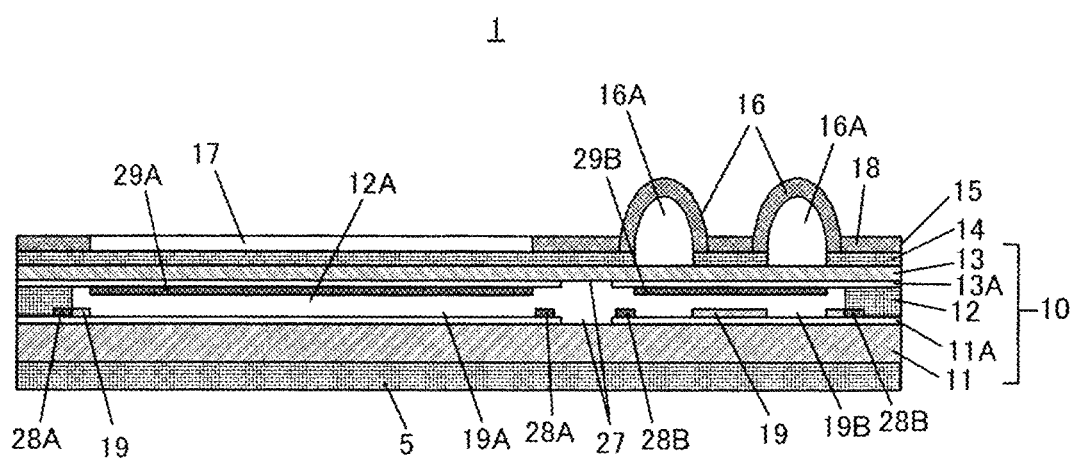
FIG. 11A is a cross-section diagram of a fifth variation of the touch panel device 1.
Figure 11B:
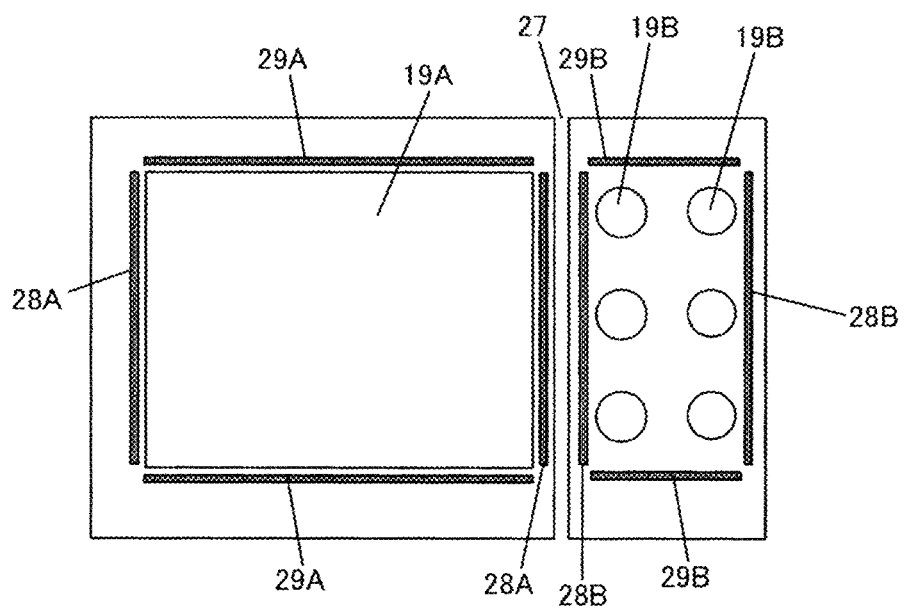
FIG. 11B is a top view of electrodes 28A, 29A, 28B and 29B, and the photoresist 19.

FIG. 11A is a cross-section diagram of a fifth variation of the touch panel device 1. FIG. 11B is a top view of electrodes 28A, 29A, 28B and 29B, and the photoresist 19.

In the touch panel device 1 of FIG. 11A, the conductive films 11A and 13A under the switch unit 16 are separated from the conductive films 11A and 13A under the operation domain 17 by an etched domain 27. Two electrodes 28B are formed opposite to each other on the conductive film 11A under the switch unit 16. Two electrodes 29B are formed opposite to each other on the conductive film 13A under the switch unit 16. Two electrodes 28A are formed opposite to each other on the conductive film 11A under the operation domain 17. Two electrodes 29A are formed opposite to each other on the conductive film 13A under the operation domain 17. Each of the electrodes 28A and 29A surrounding the operation domain 17 serves as a first electrode, and each of the electrodes 28B and 29B surrounding the switch unit 16 serves as a second electrode.

In the touch panel 10, the switch unit 16 and the operation domain 17 share the film 13 and the glass substrate 11. However, each of the conductive films 11A and 13A is separated at a position between the switch unit 16 and the operation domain 17. The electrodes 28A and 29A surrounding the operation domain 17 are provided separately from the electrodes 28B and 29B surrounding the switch unit 16. That is, in the touch panel 10 of FIGS. 11A and 11B, two independent touch panels sharing the film 13 and the glass substrate 11 are arranged under the switch unit 16 and the operation domain 17.

If the conductive films 11A and 13A are not separated and the electrodes for the switch unit 16 and the operation domain 17 are also not separated, when the switch unit 16 and the operation domain 17 are operated at the same time, a coordinate of a middle point between operation positions of the switch unit 16 and the operation domain 17 is detected, and hence unintended operation may be input. On the contrary, in the touch panel of FIGS. 11A and 11B, the conductive films 11A and 13A under the operation domain 17 and the electrodes 28A and 29A are separated from the conductive films 11A and 13A under the switch unit 16 and the electrodes 28B and 29B, and therefore touch input of the respective domains can be detected independently when the switch unit 16 and the operation domain 17 are operated at the same time.

Moreover, even when any one of the two touch panels under the switch unit 16 and the operation domain 17 has a failure, the configuration of FIGS. 11A and 11B has an advantage of having no influence on the operation of the other touch panel. For example, the two touch panels under the switch unit 16 and the operation domain 17 are four-wire type touch panels, but may be five-wire type touch panels. Especially, the touch panel under the switch unit 16 is preferably the five-wire type touch panel. This is because the five-wire type touch panel in which the electrodes serving as probes are formed on the conductive film 13A under the switch unit 16 can perform position detection even when a crack occurs in the conductive film 13A, and the five-wire type touch panel has high durability compared with the four-wire type touch panel.

Figure 12:
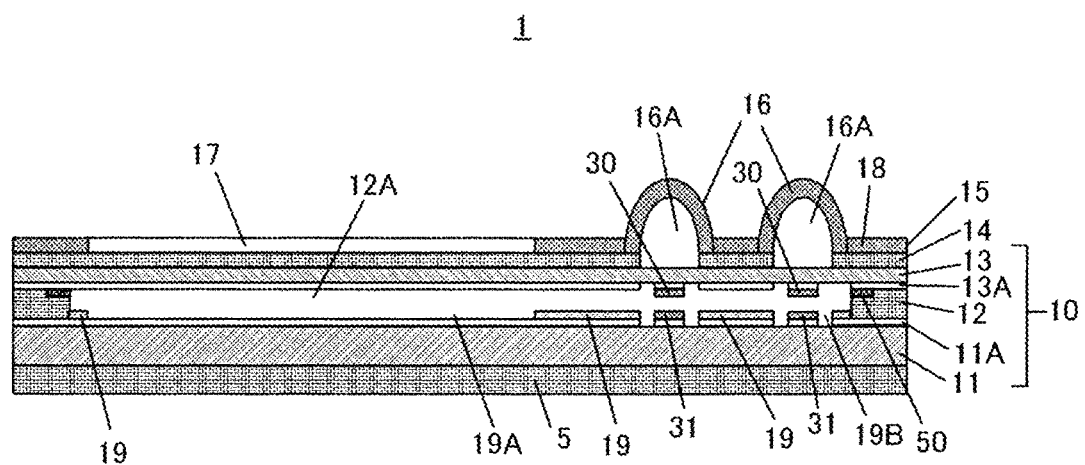
FIG. 12 is a cross-section diagram of a sixth variation of the touch panel device 1.

FIG. 12 is a cross-section diagram of a sixth variation of the touch panel device 1. In the touch panel device 1 of FIG. 12, a contact 31 is formed on the conductive film 11A under each switch unit 16, and a contact 30 is formed on the conductive film 13A under each switch unit 16. Then, a domain of the conductive film 11A on which the contact 31 is formed is separated from the other parts of the conductive film 11A by etching. Similarly, a domain of the conductive film 13A on which the contact 30 is formed is separated from the other parts of the conductive film 13A by etching. In this case, the switch unit 16 is decoratively printed so as to hide the contacts 30 and 31. Other elements of FIG. 12 are the same as corresponding elements of FIG. 3A.

Since each switch unit 16 has independent contact point structure as illustrated in FIG. 12, simultaneous input of the plurality of switch units 16 can be performed and the touch input of the operation domain 17 can be performed while depressing the switch unit 16. Here, the contacts 30 and 31 are made of the transparent electrodes, and the switch unit 16 may be transparent. In this case, since the touch panel 10 and the switch unit 16 are transparent, an image displayed on the switch unit 16 by the display 5 can be changed freely.

Figure 13:
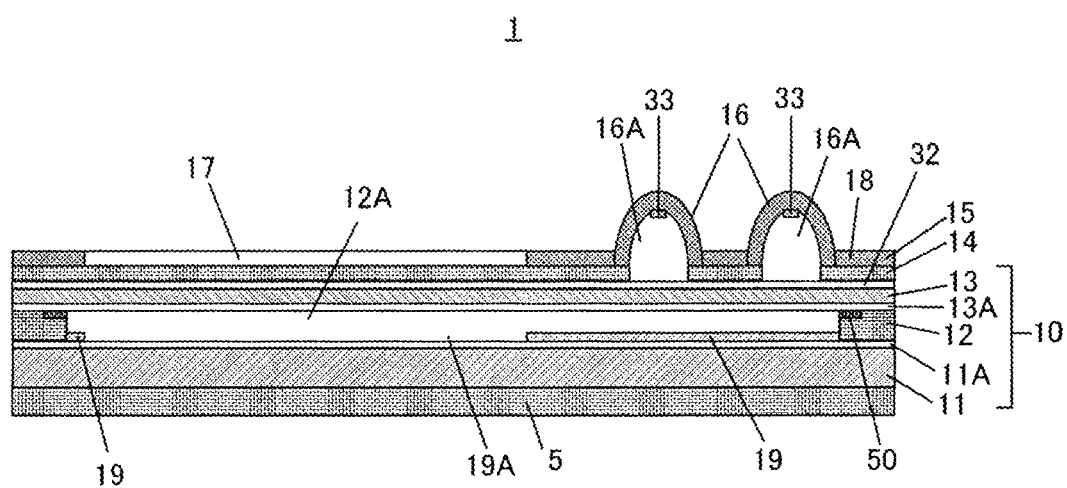
FIG. 13 is a cross-section diagram of a seventh variation of the touch panel device 1.

FIG. 13 is a cross-section diagram of a seventh variation of the touch panel device 1. In the touch panel device 1 of FIG. 13, a conductive film 32 as a third transparent conductive film is formed on the film 13. That is, the conductive film 32 is located opposite to the conductive film 13A with respect to the film 13, and is formed between the adhesive layer 14 and the film 13. Moreover, a contact 33 is formed on the top of a back side of each switch unit 16. Moreover, the insulating photoresist 19 is formed on the conductive film 11A under the switch unit 16. Other elements of FIG. 13 are the same as corresponding elements of FIG. 3A.

In FIG. 13, a switch is composed of the contact 33 and the conductive film 32, and a switch composed of the conductive films 11A and 13A under the switch unit 16 is canceled by the photoresist 19. Thus, the switch is composed of the contact 33 and the conductive film 32, so that the switch unit 16 can be arranged on a frame portion (e.g. an outer periphery of the touch panel device 1 where the adhesive layer 12 is arranged) of the touch panel device 1. The conductive films 11A and 13A corresponding to the frame portion are prevented from contacting with each other, the switch unit 16 is arranged on the frame portion of the touch panel device 1, and hence the operation domain 17 can be enlarged.

Figure 14:
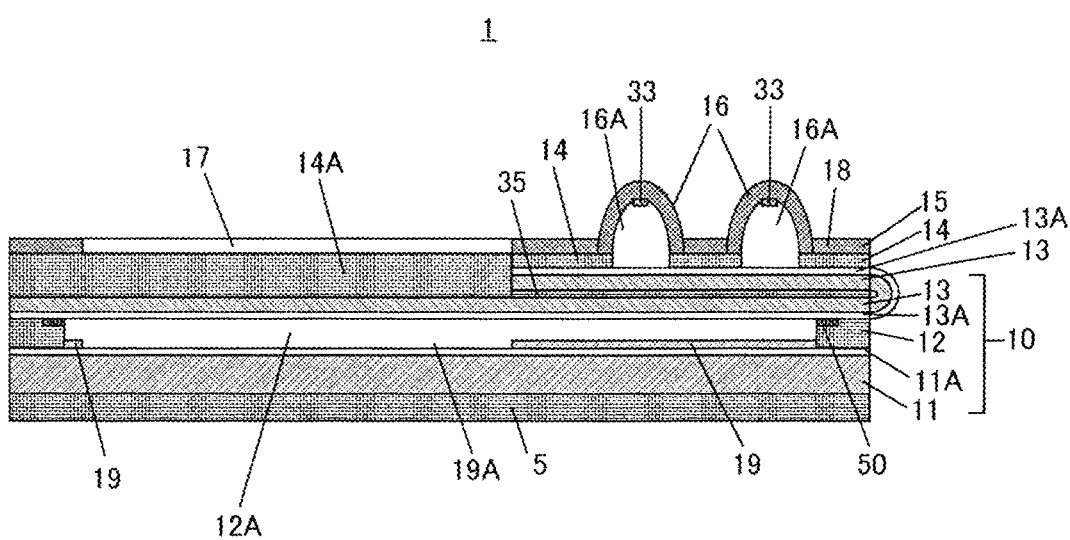
FIG. 14 is a cross-section diagram of an eighth variation of the touch panel device 1.

FIG. 14 is a cross-section diagram of an eighth variation of the touch panel device 1. In the touch panel device 1 of FIG. 14, the film 13 and the conductive film 13A are folded and doubly overlapped under the switch unit 16. The folded conductive film 13A is opposite to the contact 33 formed on the top of a back side of each switch unit 16. In the configuration of FIG. 14, the conductive films 13A and 32 do not have to be formed on both surfaces of the film 13 as illustrate in FIG. 13, and the conductive film 13A opposite to the contact 33 can be formed by folding a part of the film 13, which can reduce a manufacturing cost.

An adhesive layer 35 (e.g. an optical paste and a double-stick tape) is stuck between the folded films 13. The lift of the folded film 13 is prevented by the adhesive layer 35.

The adhesive layer 14 on the folded film 13 and the folded conductive film 13A is made thinner than an adhesive layer 14A between the operation domain 17 and the film 13. The thickness of the adhesive layer 14A is preferably the same as a total of the thicknesses of the adhesive layer 35, the folded film 13, the conductive film 13A and the adhesive layer 14. For example, the thickness of the adhesive layer 14A is 175 μm, the thickness of the adhesive layer 14 is 50 μm, and the total of the thicknesses of the adhesive layer 35, the film 13 and the conductive film 13A is 125 μm. Thus, the thickness of the adhesive layer 14A is made identical with the total of the thicknesses of the adhesive layer 35, the film 13, the conductive film 13A and the adhesive layer 14, and hence the flatness of the decorative film 15 can be secured FIG. 15A is an enlarged cross-section diagram of the switch unit 16 when the touch panel device 1 includes dot-like photoresists 19. FIG. 15B is a diagram illustrating state transition of the switch unit 16 when the touch panel device 1 includes no dot-like photoresists 19. FIG. 15C is a diagram illustrating a reference example of the switch unit 16 when the touch panel device 1 includes no dot-like photoresists 19.

As illustrated in FIG. 15A, the plurality of dot-like photoresists 19 may be formed in a hole 19B formed on the conductive film 11A just below the switch unit 16. It is preferable that a distance between the centers of the dot-like photoresists 19 is 1 mm or less, and a single dot-like photoresist 19 is 0.05 to 0.1 mm square.

When the switch unit 16 is depressed by an operator as illustrated in FIG. 15B, the film 13 and the conductive film 13A just below the switch unit 16 sink and contact the conductive film 11A. Then, when the switch unit 16 returns to an original shape, a restoring force P1 is applied upward to the center of the switch unit 16 and a downward stress P2 is applied to an outer periphery of the switch unit 16. Therefore, the film 13 and the conductive film 13A just below the switch unit 16 are slightly pushed downward by the stress P2. Since the dot-like photoresists 19 are not formed on the conductive film 11A just below the switch unit 16 in FIG. 15B, the conductive film 13A which is pushed downward by the stress P2 contacts the conductive film 11A, and hence an erroneous input of the switch unit 16 occurs.

On the contrary, in the configuration of FIG. 15B, when the switch unit 16 is depressed by the operator, the conductive film 13A contacts a portion of the conductive film 11A on which the photoresists 19 are not formed. Thereby, the conductive films 11A and 13A conduct each other, and the ON/OFF of the switch unit 16 is detected. Then, when the switch unit 16 returns to the original shape, the conductive film 13A is slightly pushed down by the downward stress as with FIG. 15A, but the dot-like photoresists 19 prevent the conductive films 11A and 13 from contacting. Therefore, the erroneous input of the switch unit 16 can be prevented.

Moreover, to change a click feeling of the switch unit 16, there is a method of inserting a click sheet 36 just below the switch unit 16 as illustrated in FIG. 15C. In this case, the adhesive layer 14 bends downward by the thickness of the click sheet 36, and the film 13 is pushed down to some extent even when the switch unit 16 is not pushed down. In this state, when the periphery of the switch unit 16 is pushed down or another switch unit 16 adjacent to the switch unit 16 is pushed down, the switch unit 16 may become an ON state. Therefore, even when the click sheet 36 is used, the dot-like photoresists 19 are preferably formed on the conductive film 11A just below the switch unit 16.

Figure 16A:
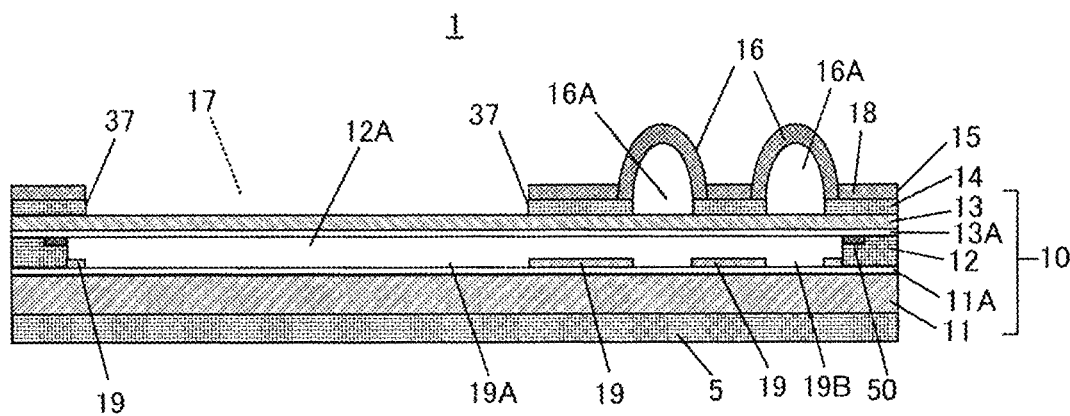
FIG. 16A is a cross-section diagram illustrating a reference example of the touch panel device 1.
Figure 16B:
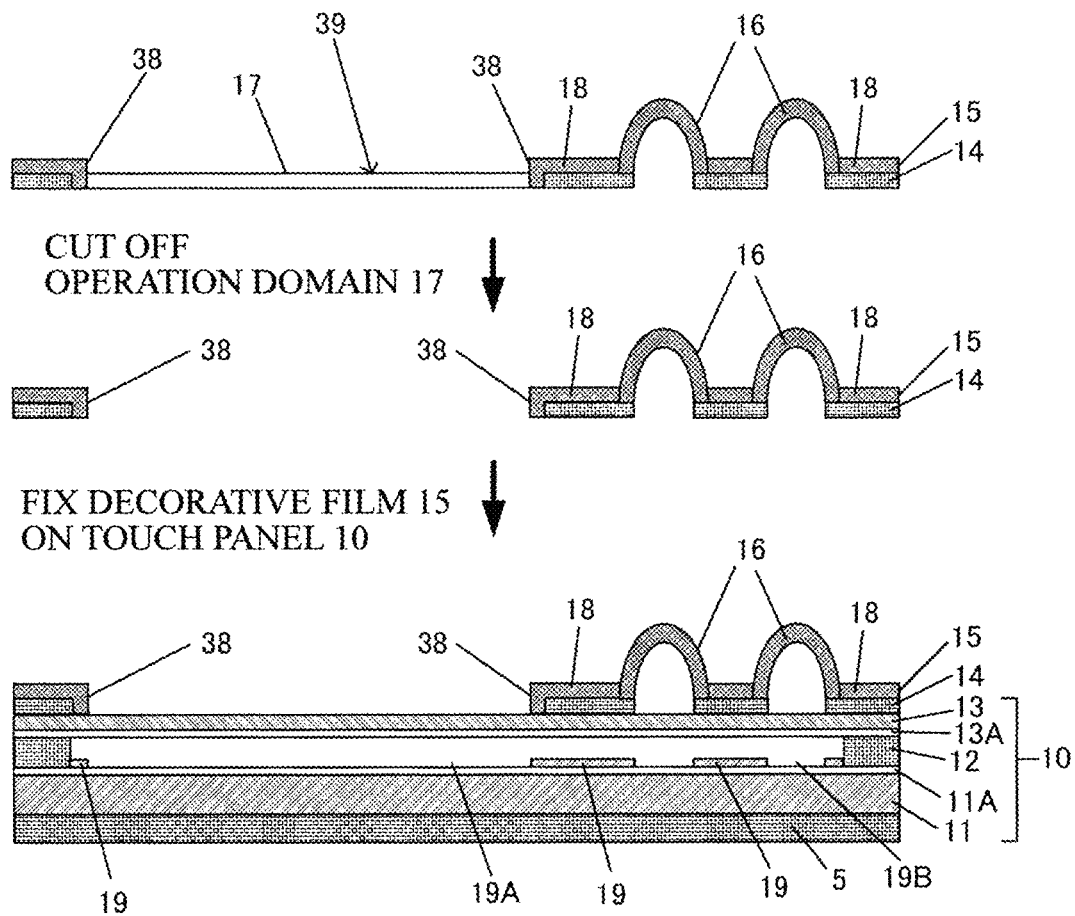
FIG. 16B is a diagram illustrating a process flow for processing the decorative film 15 and producing the touch panel device 1.

FIG. 16A is a cross-section diagram illustrating a reference example of the touch panel device 1. FIG. 16B is a diagram illustrating a process flow for processing the decorative film 15 and producing the touch panel device 1. Other elements of the touch panel 10 of FIGS. 16A and 16B are the same as corresponding elements of the touch panel 10 of FIG. 3A.

In the touch panel device 1 of FIG. 16A, the decorative film 15 corresponding to the operation domain 17 is cut off, and the adhesive layer 14 under the operation domain 17 is also cut off. In this case, the increase of the input load to the touch panel 10 can be suppressed and the transmissivity of the touch panel 10 can be maintained, compared with a case where the decorative film 15 is arranged on the operation domain 17. On the other hand, an edge 37 of the adhesive layer 14 is exposed from a portion where the decorative film 15 is cut off, and hence foreign substances may attach to the adhesive layer 14.

Therefore, when convex-shaped embossing is performed on the decorative film 15 in order to form the switch unit 16 as illustrated in FIG. 16B, recess processing is performed on a portion of the decorative film 15 which corresponds to the operation domain 17 and on which the adhesive layer 14 is formed, and the operation domain 17 is transformed to a concave. Then, the portion of the decorative film 15 corresponding to the operation domain 17 is cut off. A reference numeral 39 indicates a recess formed by the recess processing. The decorative film 15 in which the portion corresponding to the operation domain 17 is cut off is fixed on the touch panel 10 with the adhesive layer 14, so that the touch panel device 1 is produced.

The recess processing is performed on the operation domain 17, so that an edge 38 of the recess 39 of the decorative film 15 extends downward. That is, the edge 38, i.e., a wall portion extending downward is formed on a boundary between the operation domain 17 and the non-operation domain 18. Thereby, after the operation domain 17 is cut off, the adhesion layer 14 is not exposed by the edge 38, and hence the adhesion of the foreign substances is prevented. Since the edge 38 extends downward, an edge face of the decorative film 15 is also decorated and the design can be improved.

Figure 17A:
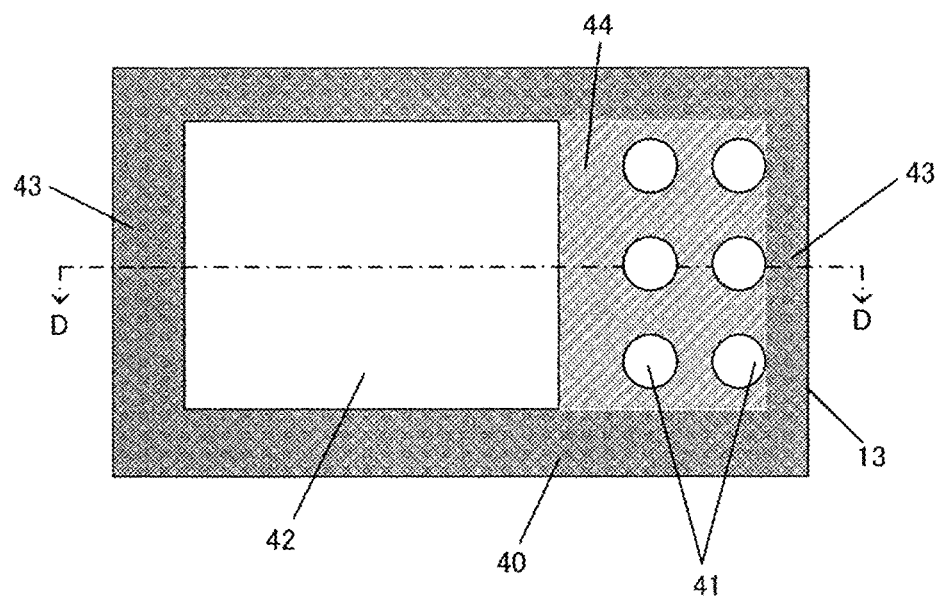
FIG. 17A is a top view of a ninth variation of the touch panel device 1.
Figure 17B:
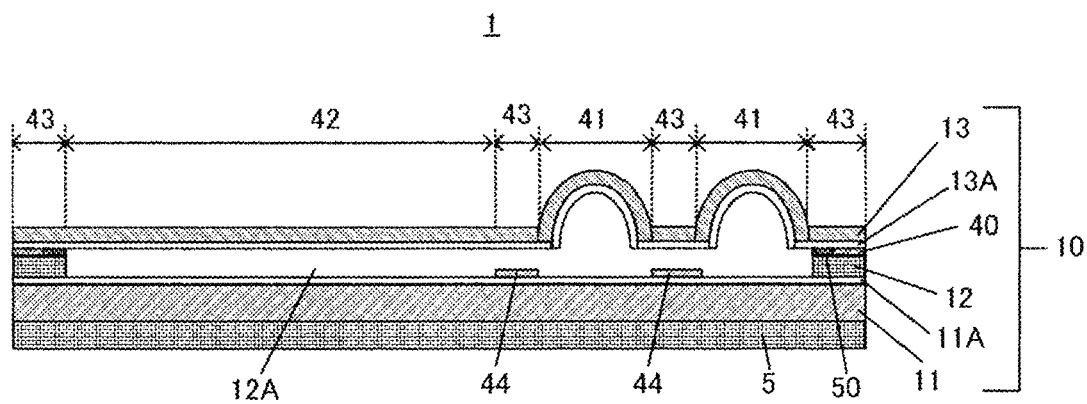
FIG. 17B is a cross-section diagram taken along line D-D in FIG. 17A.

FIG. 17A is a top view of a ninth variation of the touch panel device 1. FIG. 17B is a cross-section diagram taken along line D-D in FIG. 17A.

The touch panel device 1 according to the ninth variation does not include the decorative film 15. The touch panel 10 according to the ninth variation is the resistive film type touch panel, and includes the glass substrate 11, the conductive film 11A, the adhesive layer 12, the film 13, the conductive film 13A, and a decorative printing layer 40. The glass substrate 11 and the film 13 are transparent. The air gap 12A is formed between the glass substrate 11 and the film 13. The adhesive layer 12 is the double-stick tape, for example. The decorative printing layer 40 is formed between the conductive film 13A and the adhesive layer 12 arranged on an outer periphery of the touch panel 10, and for example is made of a black ink or a black film to hide a wiring, or the like. The film 13 is composed of the PET (polyethylene terephthalate) film, for example. The conductive film 11A is formed on the upper surface of the glass substrate 11. The conductive film 13A is formed on the lower surface of the film 13. The conductive films 11A and 13A contact each other, so that touch input is carried out. A transparent insulating photoresist 44 is formed on the conductive film 11A. The photoresist 44 prevents the conductive films 11A and 13A from contacting each other.

The film 13 includes: projection-shaped switch units 41 that project by embossing; an operation domain 42 opposite to a domain of the touch panel 10 receiving the touch input; and a non-operation domain 43 opposite to a domain of the touch panel 10 not receiving the touch input. A domain of the film 13 just above the photoresist 44 becomes the non-operation domain 43.

Since the photoresist 44 is transparent, the operator can see an image displayed on the display 5 just below the photoresist 44. As a result, in a part other than the outer periphery of the touch panel 10 on which the decorative printing layer 40 is arranged, the operator can see the image displayed on the display 5.

In the touch panel device 1 according to the ninth variation, the embossing is directly performed on the film 13, the decorative film 15 is not stuck on the film 13, and therefore the increase of the input load to the touch panel 10 can be suppressed.

The ventilation passage 20 illustrated in FIG. 5B may be formed so as to connect openings of the photoresist 44 to each other. Moreover, the UV curing resin 21 illustrated in FIG. 5A may be formed on the photoresist 44. The UV curing resin 21 formed on the photoresist 44 also may include the ventilation passage 20 which enables the air to flow in and out and connects the openings 21B to each other (see FIG. 7A). The hole diameter of each opening 21B of the UV curing resin 21 formed on the photoresist 44 may be smaller than that of each hole of the photoresist 44 (see FIG. 7B). Moreover, the air passage 25 connecting the air gap 12A to the outside may be formed on the adhesive layer 12 of FIG. 17B (see FIG. 9). In addition, the conductive films 11A and 13A just below the non-operation domain 43 between the switch unit 41 and the operation domain 42 of FIG. 17B are separated by etching, and the electrodes 28A, 29A, 28B and 29B may be formed such that the independent touch panels are arranged under the switch unit 41 and the operation domain 42, respectively (see FIG. 11B). A plurality of dot-like photoresists 44 may be formed on the conductive film 11A just below the switch unit 41 of FIG. 17B (see FIG. 15A).

Figure 18A:
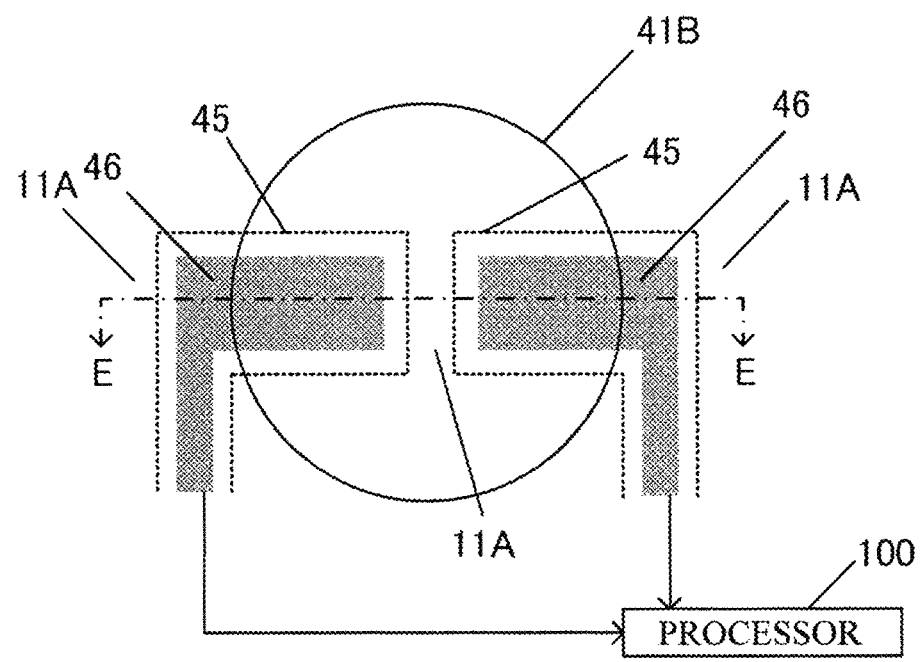
FIG. 18A is a top view of a switch unit 41.
Figure 18B:
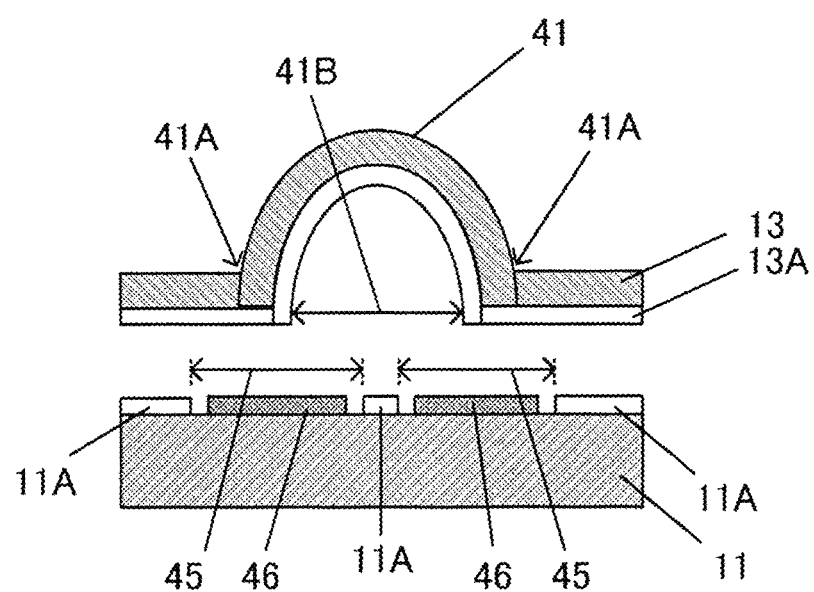
FIG. 18B is a cross-section diagram taken along line E-E in FIG. 18A.

FIG. 18A is a top view of the switch unit 41, and FIG. 18B is a cross-section diagram taken along line E-E in FIG. 18A. A reference numeral 41B of FIGS. 18A and 18B indicates an inner diameter of the switch unit 41.

The conductive film 11A is formed on the glass substrate 11. A pair of etching domains 45 is formed on the conductive film 11A just below the switch unit 41 by laser etching, and the conductive film 11A inside the pair of etching domains 45 is removed. Wiring patterns 46 are formed inside the etching domains 45, respectively. The pair of wiring patterns 46 is electrically insulated from the conductive film 11A. Moreover, one of the wiring patterns 46 is electrically insulated from the other of the wiring patterns 46. The pair of wiring patterns 46 is connected to a processor 100 detecting ON/OFF of the switch unit 41.

When the pair of wiring patterns 46 is not formed under the switch unit 41, if a crack occurs in the conductive film 13A under an outer periphery 41A of the switch unit 41, a voltage value detected at the time of pushing of the switch unit 41 becomes abnormal and the processor 100 may not accurately detect ON/OFF of the switch unit 41.

On the contrary, when the pair of wiring patterns 46 is formed just below the switch unit 41, even if the crack occurs in the conductive film 13A under the outer periphery 41A, the conductive film 13A just below the switch unit 41 is electrically connected between the wiring patterns 46, and hence the processor 100 can accurately detect ON/OFF of the switch unit 41. For example, when a voltage of 5V is applied to one of the wiring patterns 46 and a voltage of 0V is applied to the other of the wiring patterns 46, if the switch unit 41 is depressed, the conductive film 13A just below the switch unit 41 contacts the wiring patterns 46, the wiring patterns 46 are electrically connected to each other, and hence the processor 100 can accurately detect ON of the switch unit 41. Therefore, regardless of the occurrence of the crack of the conductive film 13A, the processor 100 can accurately detect ON/OFF of the switch unit 41 by detecting a voltage from the switch unit 41.

The wiring patterns 46 are made of silver, for example. Since other wirings of the touch panel 10 are made of silver, the wiring patterns 46 can be formed together with the other wirings of the touch panel 10 and hence the manufacturing cost of the touch panel 10 can be suppressed.

Moreover, the wiring patterns 46 may be made of a transparent conductive film (Indium Tin Oxide), for example. In this case, the wiring patterns 46 can be formed by only performing etching of the conductive film 11A by laser etching, and hence the manufacturing cost of the touch panel 10 can be suppressed.

In the case of the touch panel device 1 including the decorative film 15, the etching domains 45 and the wiring patterns 46 may be formed on the conductive film 11A just below the switch unit 16.

Figure 19A:
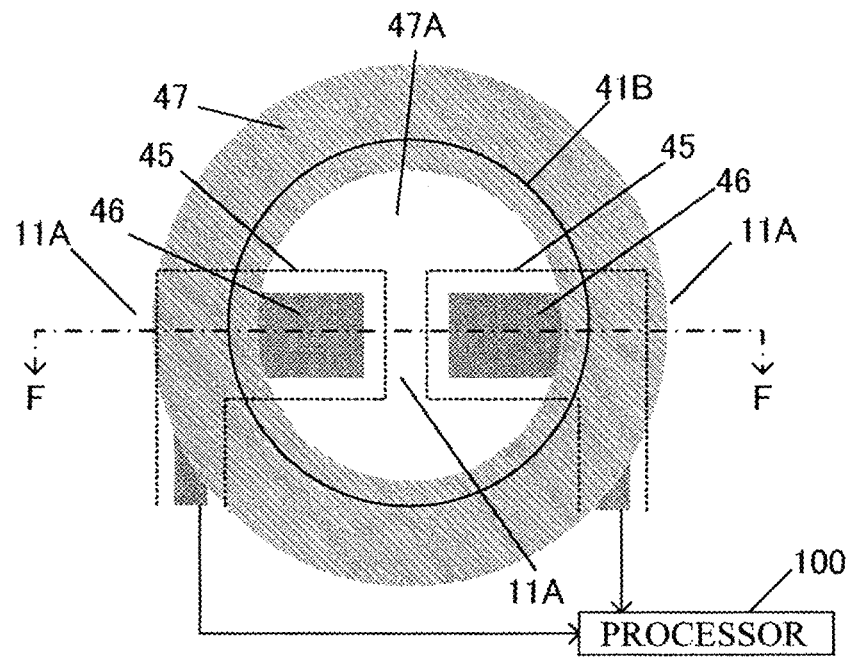
FIG. 19A is a top view of a first variation of the switch unit 41.
Figure 19B:
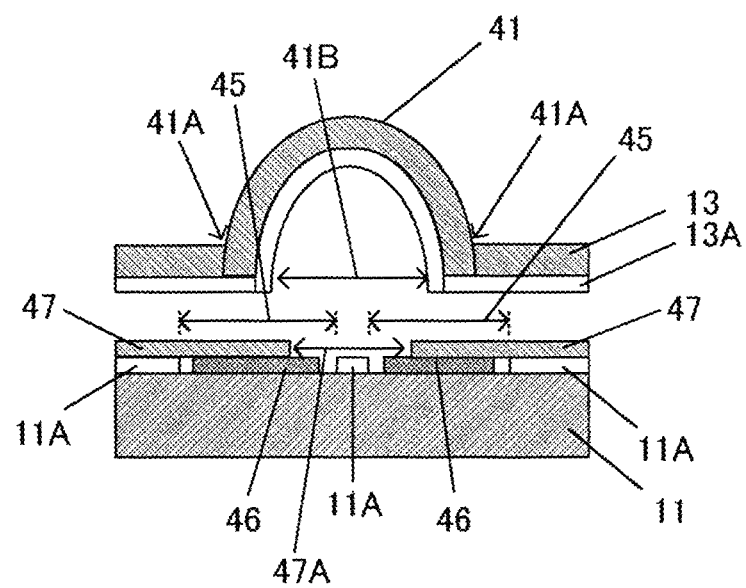
FIG. 19B is a cross-section diagram taken along line F-F in FIG. 19A.

FIG. 19A is a top view of a first variation of the switch unit 41, and FIG. 19B is a cross-section diagram taken along line F-F in FIG. 19A.

In FIGS. 19A and 19B, an insulating layer 47 such as the photoresist is formed on the wiring patterns 46 and the conductive film 11A. The insulating layer 47 includes an opening 47A having a diameter smaller than the inner diameter 41B of the switch unit 41. The wiring patterns 46 and the conductive film 11A arranged under the opening 47A are exposed from the opening 47A. In FIGS. 19A and 19B, when the switch unit 41 is depressed, the conductive film 13A just below the switch unit 41 is electrically connected between the wiring patterns 46 inside the opening 47A.

Since the insulating layer 47 is formed around the opening 47A, an erroneous input of the switch unit 41 is reduced, compared with the structure of the switch unit 41 of FIGS. 18A and 18B. Moreover, since an exposure part of the wiring patterns 46 becomes narrower than that of the wiring patterns 46 of FIGS. 18A and 18B by the formation of the insulating layer 47 and is arranged under the insulating layer 47, the processor 100 can detect ON of the switch unit 41 when the operator steadily depresses the switch unit 41.

Here, in the case of the touch panel device 1 including the decorative film 15, the etching domains 45 and the wiring patterns 46 may be formed on the conductive film 11A just below the switch unit 16, and the insulating layer 47 such as the photoresist may be formed on the wiring patterns 46 and the conductive film 11A.

Figure 20:
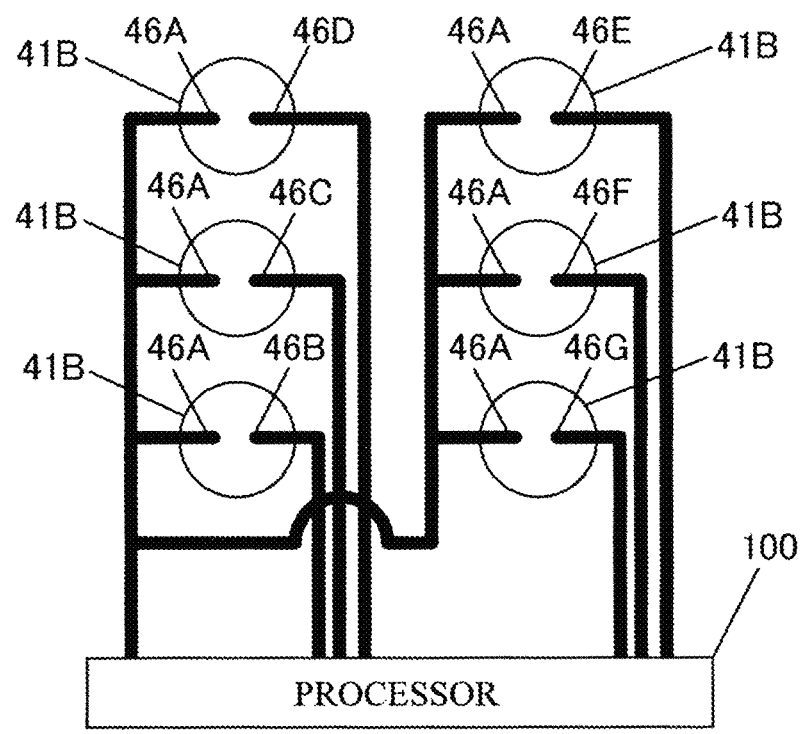
FIG. 20 is a diagram illustrating an arrangement relationship between switch units 41 and wiring patterns 46.

FIG. 20 is a diagram illustrating an arrangement relationship between the switch units 41 and the wiring patterns 46. Here, marks "A" to "G" are added to the wiring patterns 46 in order to distinguish the wiring patterns 46.

A wiring pattern 46A as a common terminal and any one of wiring patterns 46B to 46G are included in the inner diameter 41B of each of the switch units 41. The wiring pattern 46A is insulated from the wiring patterns 46B to 46G. The wiring patterns 46A provided in the inner diameters 41B of the switch units 41 are coupled with each other as a common terminal. Thus, the wiring patterns 46A included in the respective switch units 41 are made common, so that the number of wirings can be reduced.

It is assumed that a voltage is applied to the wiring pattern 46A and the wiring pattern 46B is grounded, or the voltage is applied to the wiring pattern 46B and the wiring pattern 46A is grounded. In this case, a current flowing into the wiring patterns 46A and 46B changes in accordance with a force applied to the conductive films 11A and 13A when the switch unit 41 turns on. Therefore, the processor 100 can detect a depression pressure of the switch unit 41 based on a current value when the switch unit 41 turns on.

Here, in the case of the touch panel device 1 including the decorative film 15, the pair of wiring patterns 46 may be formed on the conductive film 11A just below each of the switch units 41, and the wiring pattern 46A as the common terminal and any one of the wiring patterns 46B to 46G may be included in the inner diameter 41B of each of the switch units 41.

Figure 21:
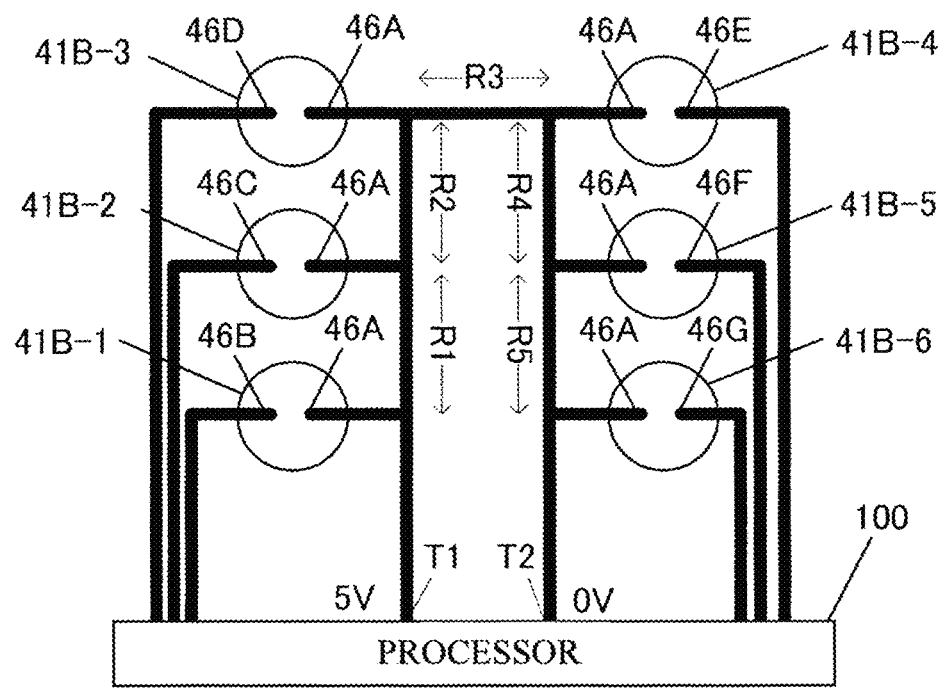
FIG. 21 is a diagram illustrating an arrangement relationship between the switch units 41 and the wiring patterns 46.

FIG. 21 is a diagram illustrating an arrangement relationship between the switch units 41 and the wiring patterns 46. Here, marks "A" to "G" are added to the wiring patterns 46 in order to distinguish the wiring patterns 46. Moreover, marks "−1" to "−6" are added to the inner diameters 41B in order to distinguish the inner diameters 41B of the switch units 41.

The wiring pattern 46A as the common terminal and any one of the wiring patterns 46B to 46G are provided in the inner diameter 41B of each of the switch units 41. Then, a voltage of 5V is applied to an end T1 of the wiring pattern 46A, and another end T2 of the wiring pattern 46A is grounded, for example.

The same are a resistance value R1 of the wiring pattern 46A between the inner diameters 41B-1 and 41B-2, a resistance value R2 of the wiring pattern 46A between the inner diameters 41B-2 and 41B-3, a resistance value R3 of the wiring pattern 46A between the inner diameters 41B-3 and 41B-4, a resistance value R4 of the wiring pattern 46A between the inner diameters 41B-4 and 41B-5, and a resistance value R5 of the wiring pattern 46A between the inner diameters 41B-5 and 41B-6.

When the voltage of 5V is applied between the end T1 and the another end T2 of the wiring pattern 46A, voltages of 3.75V, 3.25V, 2.75V, 2.25V, 1.75V and 1.25V are applied to the wiring patterns 46A in the inner diameters 41B-1 to 41B-6, respectively. Therefore, the processor 100 can detect a position of a depressed switch unit 41 based on a voltage value when each switch unit 41 turns on.

Thus, the wiring patterns 46A between two adjacent switch units 41 have the same resistance value, and therefore the processor 100 can detect the position of the depressed switch unit 41 based on a voltage value when each switch unit 41 turns on.

When the switch units 41 are arranged on a line, the wiring patterns 46B to 46G can be made into a single wiring pattern as a common terminal. In this case, an independent wiring pattern need not be prepared for each switch unit 41, and the pair of wiring patterns can be shared by the switch units 41.

Here, in the case of the touch panel device 1 including the decorative film 15, the pair of wiring patterns 46 may be formed on the conductive film 11A just below each of the switch units 41, and the wiring patterns 46A as the common terminal between the adjacent switch units 41 may have the same resistance value.

Figure 22A:
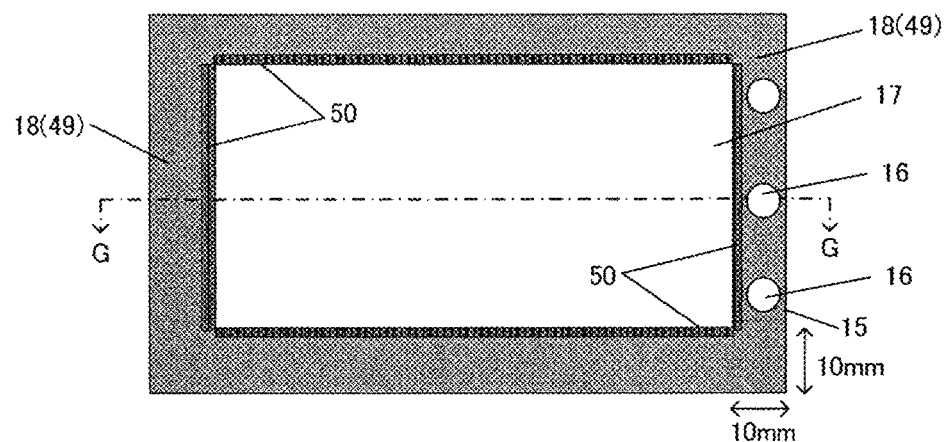
FIG. 22A is a top view of the decorative film 15 and electrodes 50.
Figure 22B:
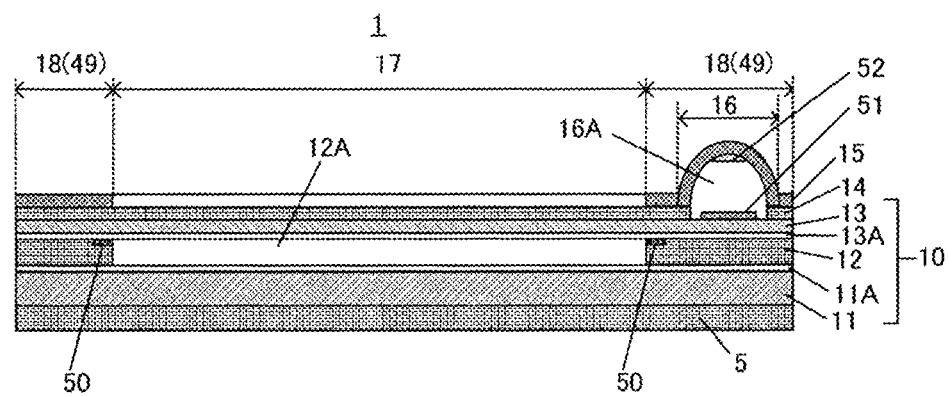
FIG. 22B is a cross-section diagram of a tenth variation of the touch panel device 1.
Figure 22C:
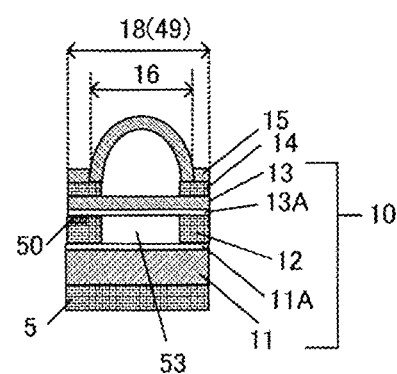
FIG. 22C is a diagram illustrating a first variation of a non-operation domain 18.
Figure 22D:
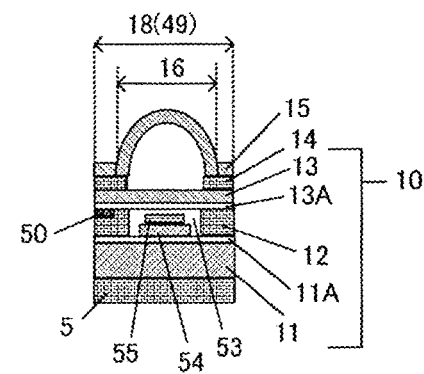
FIG. 22D is a diagram illustrating a second variation of the non-operation domain 18.

FIG. 22A is a top view of the decorative film 15 and electrodes 50. FIG. 22B is a cross-section diagram of a tenth variation of the touch panel device 1, and illustrates a cross-section surface taken along line G-G in FIG. 22A. FIG. 22C is a diagram illustrating a first variation of the non-operation domain 18. FIG. 22D is a diagram illustrating a second variation of the non-operation domain 18. FIG. 23A is a diagram illustrating a third variation of the non-operation domain 18. FIG. 23B is a diagram illustrating a fourth variation of the non-operation domain 18. FIG. 23C is a diagram illustrating wiring structure of the touch panel device 1. FIG. 23D is a diagram illustrating a variation of the film 13.

Hereinafter, a description will be given of a method for making good use of a frame portion of the touch panel device 1 which was a dead space in the past.

In FIG. 22A, the decorative film 15 includes the projection-shaped switch units 16 that project by embossing, the operation domain 17 and the non-operation domain 18, as with the decorative film 15 of FIG. 2A. In FIG. 22A, the non-operation domain 18 is a frame portion 49 of the touch panel device 1. The frame portion 49 of the touch panel device 1 is an outer periphery domain of the touch panel device 1 having a width within 10 mm, and is a domain where the adhesive layer 12 is formed. The switch units 16 are formed on the frame portion 49 of the touch panel device 1. The switch units 16 are formed outside electrodes 50 for detecting the touch input and the coordinate of the touch input, as illustrated in FIG. 22A.

The electrodes 50 are formed on the conductive film 13A, and formed at positions adjacent to the air gap 12A, as illustrated in FIG. 22B. A contact 52 is formed on the top of the back side of each switch unit 16, and a contact 51 is formed on the film 13 just below each switch unit 16 so as to be opposed to the contact 52 via the space 16A. The contacts 52 and 51 are connected to a processor, not shown. When the contact 51 contacts the contact 52, the processor detects ON of the switch unit 16.

FIG. 22C illustrates a first variation of a right side of the non-operation domain 18 of FIG. 22B. In FIG. 22C, a through-hole 53 is formed in the center of the adhesive layer 12. When the switch unit 16 is depressed, the conductive film 13A contacts the conductive film 11A via the through-hole 53, and hence the depression of the switch unit 16 is detected. The diameter of the through-hole 53 is 0.5 mm or more and less than 5 mm, for example. Moreover, the height of the through-hole 53 or the adhesive layer 12 is preferably 0.2 mm or less.

FIG. 22D illustrates a second variation of the right side of the non-operation domain 18 of FIG. 22B. In FIG. 22D, the through-hole 53 is formed in the center of the adhesive layer 12. An insulating layer 54 such as the photoresist is formed on the conductive film 11A inside the through-hole 53, and further a conductive layer 55 such as silver or silver carbon is formed on the insulating layer 54. The silver carbon is superior to silver in the durability such as against corrosion.

Since a distance between the conductive film 13A and the conductive layer 55 is shorter than a distance between the conductive films 11A and 13A, the switch unit 16 can be input by a light load.

Here, it is preferable that a position of an upper surface of the conductive layer 55 is calculated by multiplying 0.5 to 1.0 (exclusive of 1.0) by the height of the adhesive layer 12, i.e., a position which is higher than the center of the height of the adhesive layer 12 and does not exceed the height of the adhesive layer 12. This is because when the position of the upper surface of the conductive layer 55 is too low, the input sensitivity of the switch unit 16 decreases, and when the position of the upper surface of the conductive layer 55 is equal to or more than the height of the adhesive layer 12, false detection of the ON state occurs.

FIG. 23A illustrates a third variation of the right side of the non-operation domain 18 of FIG. 22B. In FIG. 23A, the projection-shaped switch unit 16 is not formed on the frame portion 49 of the touch panel device 1. However, the through-hole 53 is formed in the center of the adhesive layer 12, and hence the touch input can be performed on the frame portion 49. When the decorative film 15 is transparent, for example, an image such as an icon image from the display 5 can be displayed on the frame portion 49. This makes it possible to make good use of the frame portion 49 of the touch panel device 1 which was a dead space in past.

FIG. 23B illustrates a fourth variation of the right side of the non-operation domain 18 of FIG. 22B. When the width of the switch unit 16 is larger than the width of the adhesive layer 12, the conductive film 13A may not contact the conductive film 11A due to the thickness of the adhesive layer 12 even if the switch unit 16 is depressed. Therefore, when the width of the switch unit 16 is larger than the width of the adhesive layer 12, the insulating layer 54 is formed on the conductive film 11A so as to be adjacent to the adhesive layer 12, and further the conductive layer 55 such as silver or silver carbon is formed on the insulating layer 54. Thereby, the distance between the conductive film 13A and the conductive layer 55 is shorter than the distance between the conductive films 11A and 13A, and hence it becomes easy to perform the touch input of the switch unit 16.

Here, it is preferable that the position of the upper surface of the conductive layer 55 is calculated by multiplying 0.5 to 1.0 (exclusive of 1.0) by the height of the adhesive layer 12, i.e., the position which is higher than the center of the height of the adhesive layer 12 and does not exceed the height of the adhesive layer 12. This is because when the position of the upper surface of the conductive layer 55 is too low, the input sensitivity of the switch unit 16 decreases, and when the position of the upper surface of the conductive layer 55 is equal to or more than the height of the adhesive layer 12, false detection of the ON state occurs.

As illustrated in FIG. 23C, four electrodes 50 are connected to an FPC (Flexible Printed Circuit) 58 for touch panel wiring via wirings 56a to 56d, and the conductive layer 55 and the conductive film 13A are connected to the FPC 58 for touch panel wiring via wirings 57a and 57b, respectively. The FPC 58 is connected to a processor 59 that detects ON/OFF of the switch unit 16, and the touch input and the coordinate on the operation domain 17.

In the above-mentioned touch panel device 1, a single layer PET film is used as the film 13. However, a two-layer film 13-4 that includes two PET films 13-1 and 13-2 sandwiching an adhesive layer 13-3 may be used as the film 13, as illustrated in FIG. 23D. Since the film 13-4 is higher in flexibility than the single layer PET film, the input sensitivity of the touch panel device 1 improves. Particularly, since the outer periphery of the touch panel device 1 has lower flexibility than the center thereof, it is effective that the frame portion 49 of touch panel device 1 uses the film 13-4.

Figure 24A:
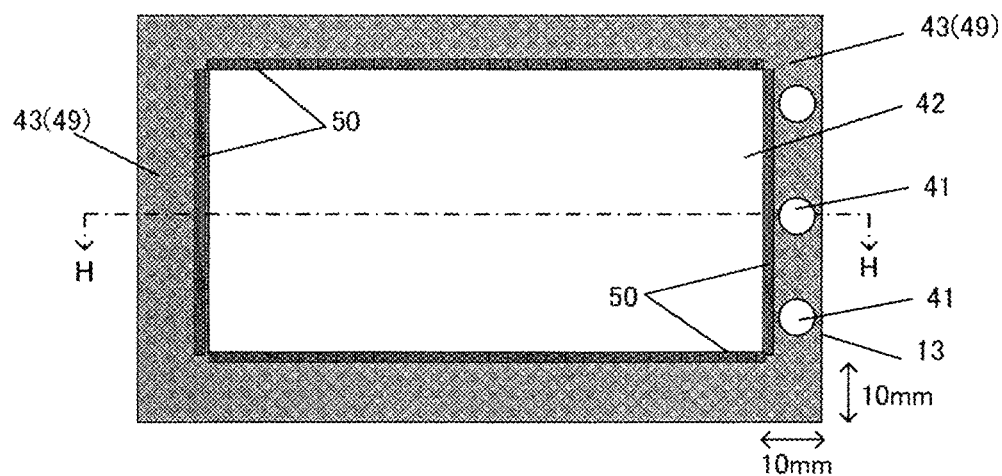
FIG. 24A is a top view of the film 13 and the electrodes 50.
Figure 24B:
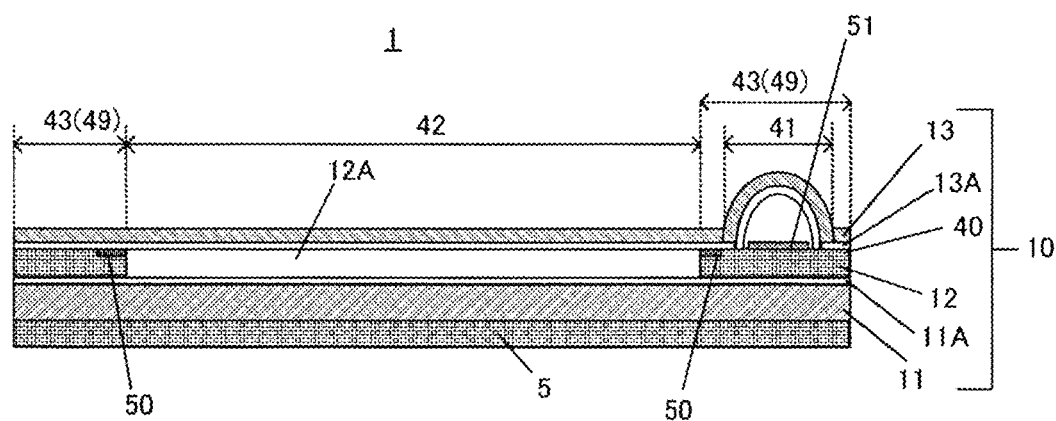
FIG. 24B is a cross-section diagram of an eleventh variation of the touch panel device 1.
Figure 24C:
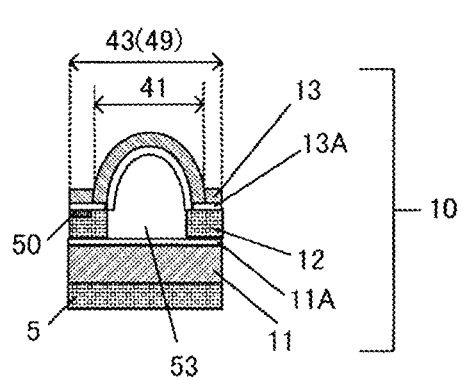
FIG. 24C is a diagram illustrating a first variation of a non-operation domain 43.
Figure 24D:
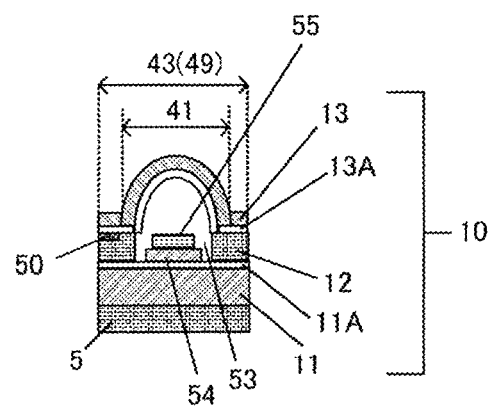
FIG. 24D is a diagram illustrating a second variation of the non-operation domain 43.
Figure 25A:
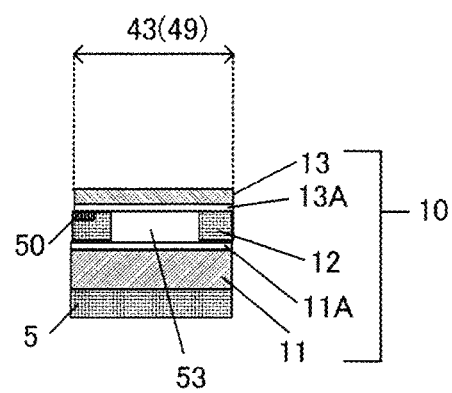
FIG. 25A is a diagram illustrating a third variation of the non-operation domain 43.
Figure 25B:
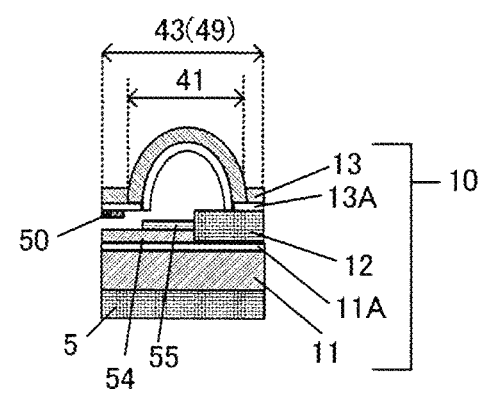
FIG. 25B is a diagram illustrating a fourth variation of the non-operation domain 43.

FIG. 24A is a top view of the film 13 and the electrodes 50. FIG. 24B is a cross-section diagram of an eleventh variation of the touch panel device 1, and illustrates a cross-section surface taken along line H-H in FIG. 24A. FIG. 24C is a diagram illustrating a first variation of the non-operation domain 43. FIG. 24D is a diagram illustrating a second variation of the non-operation domain 43. FIG. 25A is a diagram illustrating a third variation of the non-operation domain 43. FIG. 25B is a diagram illustrating a fourth variation of the non-operation domain 43.

Hereinafter, a description will be given of a method for making good use of the frame portion of the touch panel device 1 which was the dead space in past.

In FIG. 24A, the film 13 includes the projection-shaped switch units 41 that project by embossing, the operation domain 42 and the non-operation domain 43, as with the film 13 of FIG. 17B.

In FIG. 24A, the non-operation domain 43 is the frame portion 49 of the touch panel device 1. The frame portion 49 of the touch panel device 1 is the outer periphery domain of the touch panel device 1 having a width within 10 mm, and is the domain where the adhesive layer 12 is formed. The switch units 41 are formed on the frame portion 49 of the touch panel device 1. The switch units 41 are formed outside the electrodes 50 for detecting the touch input and the coordinate of the touch input, as illustrated in FIG. 24A.

The electrodes 50 are formed on the conductive film 13A, and formed at positions adjacent to the air gap 12A, as illustrated in FIG. 24B. The conductive film 13A is formed on the back side of each switch unit 41, and the contact 51 is formed on the adhesive layer 12 just below each switch unit 41. The conductive film 13A and the contact 51 are connected to a processor, not shown. When the conductive film 13A contacts the contact 51, the processor detects ON of the switch unit 41.

FIG. 24C illustrates a first variation of a right side of the non-operation domain 43 of FIG. 24B. In FIG. 24C, the through-hole 53 is formed in the center of the adhesive layer 12. When the switch unit 41 is depressed, the conductive film 13A contacts the conductive film 11A via the through-hole 53, and hence the depression of the switch unit 41 is detected. The diameter of the through-hole 53 is 0.5 mm or more and less than 5 mm, for example. Moreover, the height of the through-hole 53 or the adhesive layer 12 is preferably 0.2 mm or less.

FIG. 24D illustrates a second variation of the right side of the non-operation domain 43 of FIG. 24B. In FIG. 24D, the through-hole 53 is formed in the center of the adhesive layer 12. The insulating layer 54 such as the photoresist is formed on the conductive film 11A inside the through-hole 53, and further the conductive layer 55 such as silver or silver carbon is formed on the insulating layer 54. The silver carbon is superior to silver in the durability such as against corrosion.

Since the distance between the conductive film 13A and the conductive layer 55 is shorter than the distance between the conductive films 11A and 13A, the switch unit 41 can be input by a light load.

Here, it is preferable that the position of the upper surface of the conductive layer 55 is calculated by multiplying 0.5 to 1.0 (exclusive of 1.0) by the height of the adhesive layer 12, i.e., the position which is higher than the center of the height of the adhesive layer 12 and does not exceed the height of the adhesive layer 12. This is because when the position of the upper surface of the conductive layer 55 is too low, the input sensitivity of the switch unit 41 decreases, and when the position of the upper surface of the conductive layer 55 is equal to or more than the height of the adhesive layer 12, false detection of the ON state occurs.

FIG. 25A illustrates a third variation of the right side of the non-operation domain 43 of FIG. 24B. In FIG. 25A, the projection-shaped switch unit 41 is not formed on the frame portion 49 of the touch panel device 1. However, the through-hole 53 is formed in the center of the adhesive layer 12, and hence the touch input can be performed on the frame portion 49. For example, an image such as an icon image from the display 5 can be displayed on the frame portion 49. This makes it possible to make good use of the frame portion 49 of the touch panel device 1 which was a dead space in past.

FIG. 25B illustrates a fourth variation of the right side of the non-operation domain 43 of FIG. 24B. When the switch unit 41 is provided in the vicinity of the frame portion 49 and the adhesive layer 12 gets under the switch unit 41 as illustrated in FIG. 25B, the conductive film 13A may not contact the conductive film 11A due to the thickness of the adhesive layer 12 even if the switch unit 41 is depressed. Therefore, the insulating layer 54 is formed on the conductive film 11A so as to be adjacent to the adhesive layer 12, and further the conductive layer 55 such as silver or silver carbon is formed on the insulating layer 54. Thereby, the distance between the conductive film 13A and the conductive layer 55 is shorter than the distance between the conductive films 11A and 13A, and hence it becomes easy to perform the touch input of the switch unit 41.

Here, it is preferable that the position of the upper surface of the conductive layer 55 is the position calculated by multiplying 0.5 to 1.0 (exclusive of 1.0) by the height of the adhesive layer 12, i.e., the position which is higher than the center of the height of the adhesive layer 12 and does not exceed the height of the adhesive layer 12. This is because when the position of the upper surface of the conductive layer 55 is too low, the input sensitivity of the switch unit 41 decreases, and when the position of the upper surface of the conductive layer 55 is equal to or more than the height of the adhesive layer 12, false detection of the ON state occurs.

In the touch panel device 1 of FIGS. 24A to 25B, the two-layer film 13-4 of FIG. 23D may be used as the film 13.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel device comprising:
a first substrate having a first surface, a second surface arranged on an opposite side of the first surface, a first region receiving a touch input, and a second region not receiving the touch input;
a second substrate having a third surface facing the first surface of the first substrate via a space;
a first transparent conductive film formed on the first surface;
a second transparent conductive film formed on the third surface;
an adhesive layer formed between the first transparent conductive film and the second transparent conductive film;
a decorative film that is fixed at the second surface, and includes a switch unit that projects in a direction from the second substrate toward the first substrate;
a third transparent conductive film formed on the second surface of the first substrate; and
a contact formed on the switch unit so as to face the third transparent conductive film; and
an insulating layer that covers the second transparent conductive film under the switch unit and the second region, includes a through hole under the first region, and is away from the first transparent conductive film;
wherein the first substrate is flat, and a space is formed between the switch unit and the second surface of the first substrate.

2. A touch panel device comprising:
a first substrate having a first surface, a second surface arranged on an opposite side of the first surface, a first region receiving a touch input, and a second region not receiving the touch input;
a second substrate having a third surface facing the first surface of the first substrate via a space;
a first transparent conductive film formed on the first surface;
a second transparent conductive film formed on the third surface;
an adhesive layer formed between the first transparent conductive film and the second transparent conductive film;
a decorative film that is fixed at the second surface, and includes a switch unit that projects in a direction from the second substrate toward the first substrate; and
an insulating layer that covers the second transparent conductive film, includes a first through hole under the first region and a second through hole under the switch unit, and is away from the first transparent conductive film.

3. The touch panel device as claimed in claim 2, comprising:
an insulating dot formed in the second through hole.

4. The touch panel device as claimed in claim 2, wherein the insulating layer under the second region excluding the switch unit does not include a through hole.

5. A touch panel device comprising:
- a first substrate having a first surface, a second surface arranged on an opposite side of the first surface, a first region receiving a touch input, and a second region not receiving the touch input;
- a second substrate having a third surface facing the first surface of the first substrate via a space;
- a first transparent conductive film formed on the first surface;
- a second transparent conductive film formed on the third surface;
- an adhesive layer formed between the first transparent conductive film and the second transparent conductive film; and
- an insulating layer that covers the second transparent conductive film and is away from the first transparent conductive film,
- wherein the second surface of the first substrate includes a switch unit that projects in a direction from the second substrate toward the first substrate, and
- wherein the insulating layer includes a first through hole under the first region and a second through hole under the switch unit.

6. The touch panel device as claimed in claim 5, comprising:
- an insulating dot formed in the second through hole.

7. The touch panel device as claimed in claim 5, wherein the insulating layer under the second region excluding the switch unit does not include a through hole.

* * * * *